United States Patent
Liang

(10) Patent No.: US 12,425,930 B2
(45) Date of Patent: Sep. 23, 2025

(54) MEASUREMENT REPORTING FOR NON-TERRESTRIAL NETWORKING

(71) Applicant: Toyota Jidosha Kabushiki Kaisha, Aichi-ken (JP)

(72) Inventor: Frank F. Liang, Chantilly, VA (US)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 953 days.

(21) Appl. No.: 17/644,281

(22) Filed: Dec. 14, 2021

(65) Prior Publication Data
US 2024/0064581 A1   Feb. 22, 2024

Related U.S. Application Data

(60) Provisional application No. 63/126,400, filed on Dec. 16, 2020.

(51) Int. Cl.
| | |
|---|---|
| *H04W 36/00* | (2009.01) |
| *H04B 7/185* | (2006.01) |
| *H04L 5/00* | (2006.01) |
| *H04W 24/08* | (2009.01) |
| *H04W 36/14* | (2009.01) |

(52) U.S. Cl.
CPC .... *H04W 36/0058* (2018.08); *H04B 7/18513* (2013.01); *H04L 5/0048* (2013.01); *H04W 24/08* (2013.01); *H04W 36/14* (2013.01)

(58) Field of Classification Search
CPC . H04W 36/0058; H04W 24/08; H04W 36/14; H04W 36/0072; H04W 36/00837; H04W 36/083; H04W 36/302; H04W 36/0094; H04W 84/06; H04W 88/06; H04B 7/18513; H04L 5/0048
See application file for complete search history.

(56) References Cited

U.S. PATENT DOCUMENTS

| | | | |
|---|---|---|---|
| 2021/0105693 A1* | 4/2021 | Tripathi | H04W 84/06 |
| 2021/0119861 A1* | 4/2021 | Tripathi | H04W 48/12 |

(Continued)

OTHER PUBLICATIONS

Crosnier et al. "Handover Management Optimization for LTE Terrestrial Network with Satellite Backhaul" 2011 VTC Spring May 15-18, 2011 (Year: 2011).*

(Continued)

*Primary Examiner* — Basil Ma
(74) *Attorney, Agent, or Firm* — Finnegan, Henderson, Farabow, Garrett, and Dunner, LLP

(57) ABSTRACT

A system, method and apparatus for wireless communications is provided. A user equipment (UE) receives inter-RAT measurement configuration parameters associated with a first RAT provided by a non-terrestrial node. The inter-RAT measurement configuration parameters include information for detecting one or more events that trigger generating a measurement report. The measurement configuration parameter further include measurement information associated with the first RAT. The UE then determines one or more events based on processing the received inter RAT measurement configuration parameters. The UE generates a measurement report comprising measurement information associated with the first RAT, wherein the measurement report is based on the received inter RAT measurement configuration parameters.

21 Claims, 20 Drawing Sheets

(56) References Cited

U.S. PATENT DOCUMENTS

2022/0046490 A1* 2/2022 Tripathi ............ H04W 36/0085
2022/0046498 A1* 2/2022 Cheng ................. H04B 7/1851

OTHER PUBLICATIONS

ETSI TS 138 300, "56; NR; Overall description; Stage-2" 3GPP TS 38.300 version 15.8.0 Release 15 (2020-01), 102 pages, (part 1, pp. 1-50 ), downloadable from http://www.etsi.org/standards-search.
ETSI TS 138 300, "56; NR; Overall description; Stage-2" 3GPP TS 38.300 version 15.8.0 Release 15 (Jan. 2020), 102 pages, (part 2, pp. 51-102 ), downloadable from http://www.etsi.org/standards-search.
ETSI TS 138 331, "5G: NR; Radio Resource Control (RRC); Protocol specification", 3GPP TS 38.331 version 16.1.0 Release 16, (Jul. 2020), 886 pages, (part 1, pp. 1-296), downloadable from http://www.etsi.org/standards-search.
ETSI TS 138 331, "5G: NR; Radio Resource Control (RRC); Protocol specification", 3GPP TS 38.331 version 16.1.0 Release 16, (Jul. 2020), 886 pages, (part 2, pp. 297-591), downloadable from http://www.etsi.org/standards-search.
ETSI TS 138 331, "5G: NR; Radio Resource Control (RRC); Protocol specification", 3GPP TS 38.331 version 16.1.0 Release 16, (Jul. 2020), 886 pages, (part 3, pp. 592-886), downloadable from http://www.etsi.org/standards-search.

* cited by examiner

FIG. 3A

| Transport channel / Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3B

| Transport channel / Logical channel | UL-SCH | RACH |
|---|---|---|
| CCCH | X | |
| DCCH | X | |
| DTCH | X | |

FIG. 3C

| Transport channel / Logical channel | SL-BCH | SL-SCH |
|---|---|---|
| SBCCH | X | |
| SCCH | | X |
| STCH | | X |

| Transport channel | Physical channel | | |
|---|---|---|---|
| | PDSCH | PDCCH | PBCH |
| BCH | | | X |
| PCH | X | | |
| DL-SCH | X | | |

FIG. 4A

| Transport channel | Physical channel | | |
|---|---|---|---|
| | PUSCH | PUCCH | PRACH |
| UL-SCH | X | | |
| RACH | | | X |

FIG. 4B

| Transport channel | Physical channel | | | | |
|---|---|---|---|---|---|
| | PSSCH | PSCCH | PSFCH | PSBCH |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

```
MeasObjectSATAIRBORNE::=            SEQUENCE {
  carrierFreq                 ARFCN-ValueSATAIRBORNE,
  allowedMeasBandwidth        SATAIRBORNE-AllowedMeasBandwidth,
  cellsToRemoveListSATAIRBORNE        SATAIRBORNE-CellIndexList
OPTIONAL,   -- Need N
  cellsToAddModListSATAIRBORNE        SEQUENCE (SIZE (1..maxCellMeasSATAIRBORNE)) OF
SATAIRBORNE-Cell    OPTIONAL,   -- Need N
  blackCellsToRemoveListSATAIRBORNE   SATAIRBORNE-CellIndexList
OPTIONAL,   -- Need N
  blackCellsToAddModListSATAIRBORNE   SEQUENCE (SIZE (1..maxCellMeasSATAIRBORNE)) OF
SATAIRBORNE-BlackCell   OPTIONAL,   -- Need N
  SatAirborne-PresenceAntennaPort1    SATAIRBORNE-PresenceAntennaPort1,
  SatAirborne-Q-OffsetRange           SATAIRBORNE-Q-OffsetRange
OPTIONAL,   -- Need R
  widebandRSRQ-Meas           BOOLEAN,
  ...
}

SATAIRBORNE-CellIndexList ::=       SEQUENCE (SIZE (1..maxCellMeasSATAIRBORNE)) OF
SATAIRBORNE-CellIndex SATAIRBORNE-CellIndex ::=           INTEGER (1..maxCellMeasSATAIRBORNE)

SATAIRBORNE-Cell ::=                SEQUENCE {
  cellIndexSATAIRBORNE              SATAIRBORNE-CellIndex,
  physCellId                        SATAIRBORNE-PhysCellId,
  cellIndividualOffset              SATAIRBORNE-Q-OffsetRange
}
SATAIRBORNE-BlackCell ::=           SEQUENCE {
  cellIndexSATAIRBORNE              SATAIRBORNE-CellIndex,
  physCellIdRange                   SATAIRBORNE-PhysCellIdRange
}
```

FIG. 18

```
EventTriggerConfigInterRAT ::=    SEQUENCE {
    eventId                       CHOICE {
        eventB1                   SEQUENCE {
            b1-ThresholdEUTRA             MeasTriggerQuantityEUTRA,
            reportOnLeave                 BOOLEAN,
            hysteresis                    Hysteresis,
            timeToTrigger                 TimeToTrigger, b1-ThresholdSatAirborne       MeasTriggerQuantitySatAirborne,
            reportOnLeave                 BOOLEAN,
            hysteresis                    Hysteresis,
            timeToTrigger                 TimeToTrigger, ...
        },
        eventB2                   SEQUENCE {
            b2-Threshold1                 MeasTriggerQuantity,
            b2-Threshold2EUTRA            MeasTriggerQuantityEUTRA,
            reportOnLeave                 BOOLEAN,
            hysteresis                    Hysteresis,
            timeToTrigger                 TimeToTrigger, b2-Threshold2SatAirborne      MeasTriggerQuantitySatAirborne,
            reportOnLeave                 BOOLEAN,
            hysteresis                    Hysteresis,
            timeToTrigger                 TimeToTrigger,

MEASUREMENT REPORTING FOR NON-TERRESTRIAL NETWORKING

CROSS-REFERENCE TO RELATED APPLICATION

This application claims the benefit of U.S. Provisional Application No. 63/126,400, entitled "MEASUREMENT REPORTING FOR NON-TERRESTRIAL NETWORKING", and filed on Dec. 16, 2020. U.S. Provisional Application No. 63/126,400 is incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

FIG. 18 shows example radio resource control (RRC) information elements according to some aspects of some of various exemplary embodiments of the present disclosure.

FIG. 19 shows example radio resource control (RRC) information elements according to some aspects of some of various exemplary embodiments of the present disclosure.

DETAILED DESCRIPTION

Figure 1:
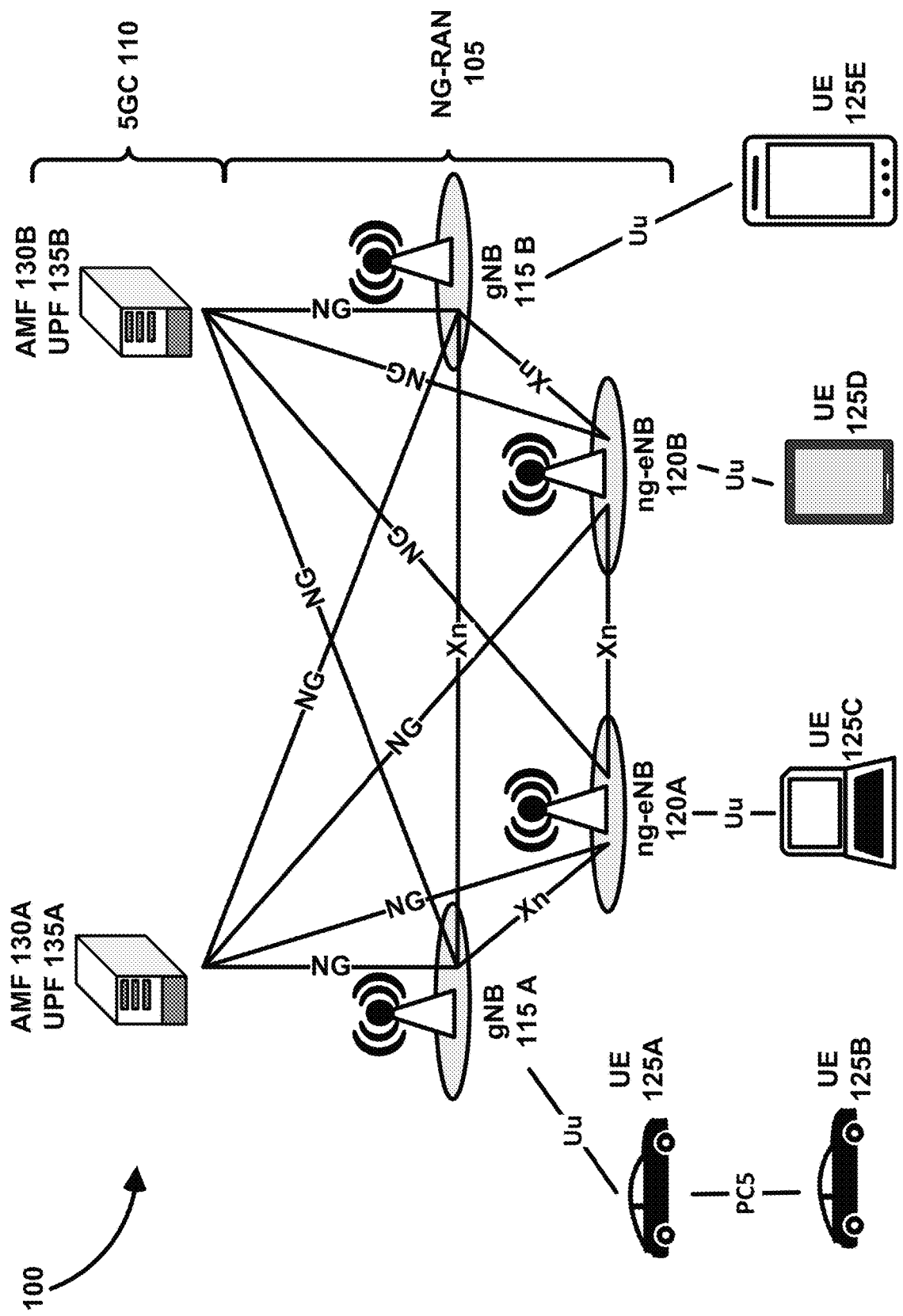
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipment (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, HOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
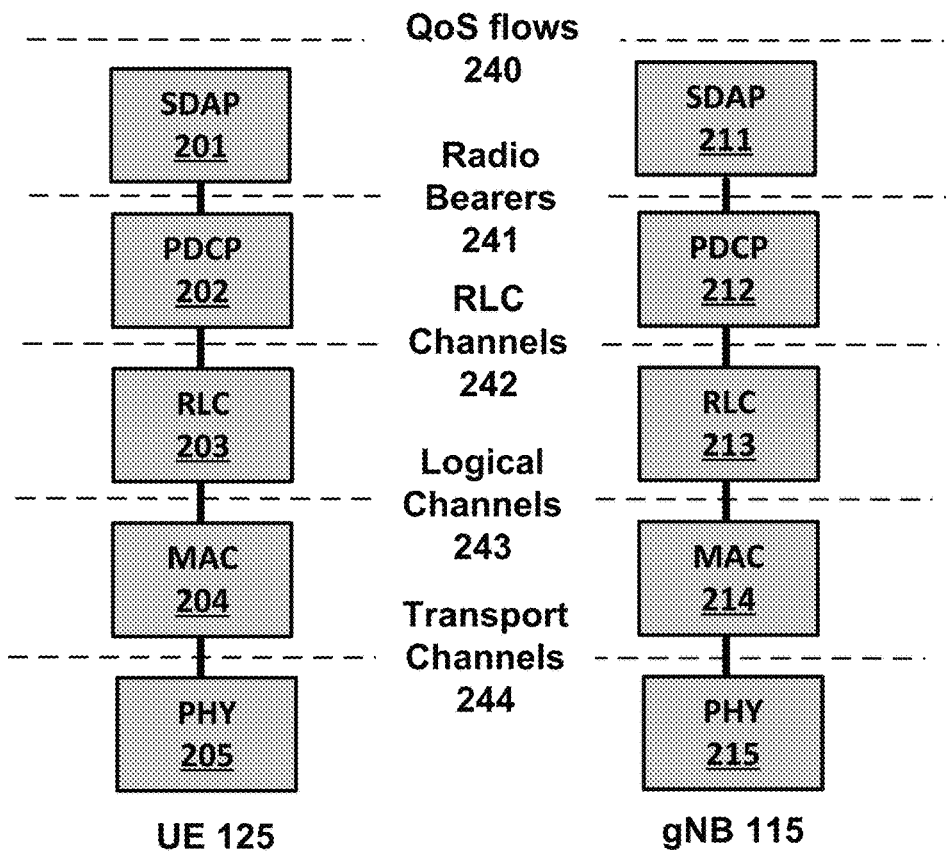
FIG. 2A and FIG. 2B show examples of radio protocol stacks for user plane and control plane, respectively, according to some aspects of some of various exemplary embodiments of the present disclosure.
Figure 2B:
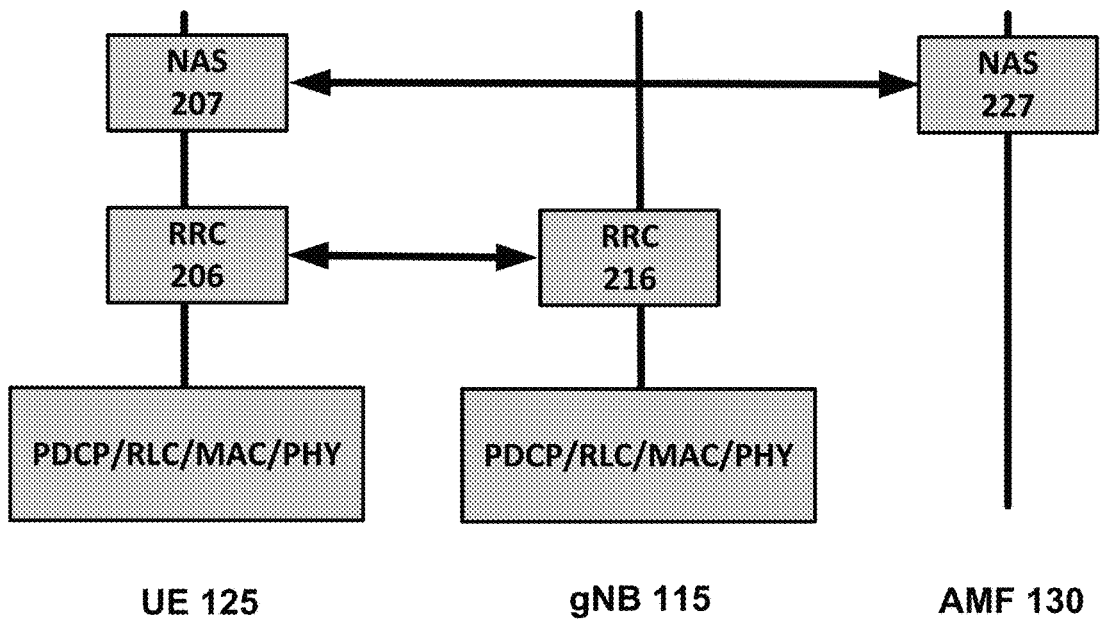

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by predefined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
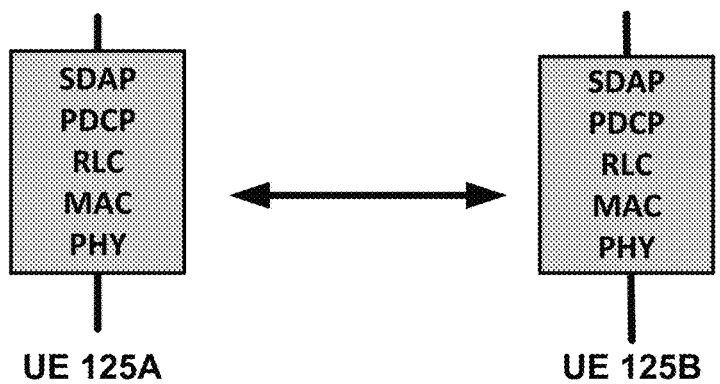
FIG. 5A, FIG. 5B, FIG. 5C and FIG. 5D show examples of radio protocol stacks for NR sidelink communication according to some aspects of some of various exemplary embodiments of the present disclosure.
Figure 5B:
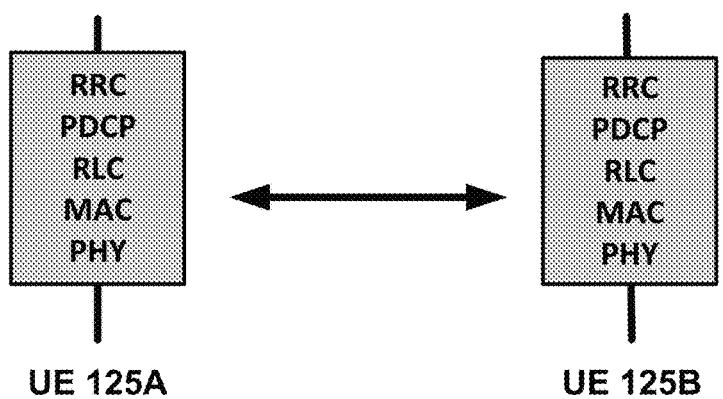
Figure 5C:
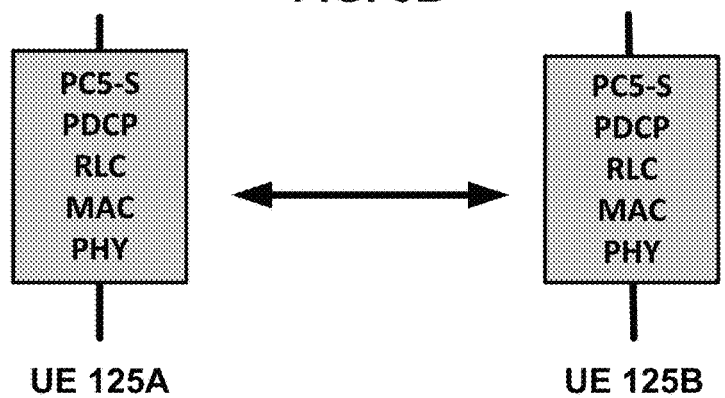
Figure 5D:
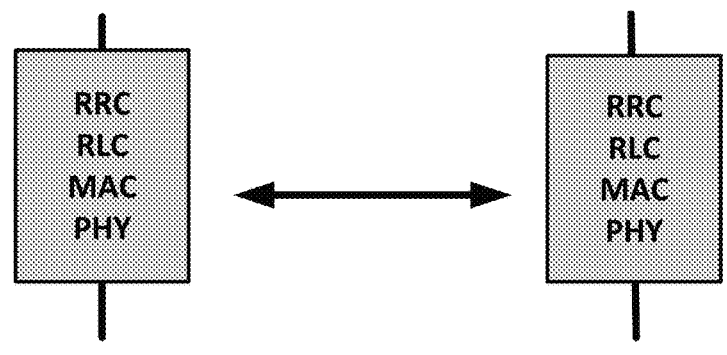

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
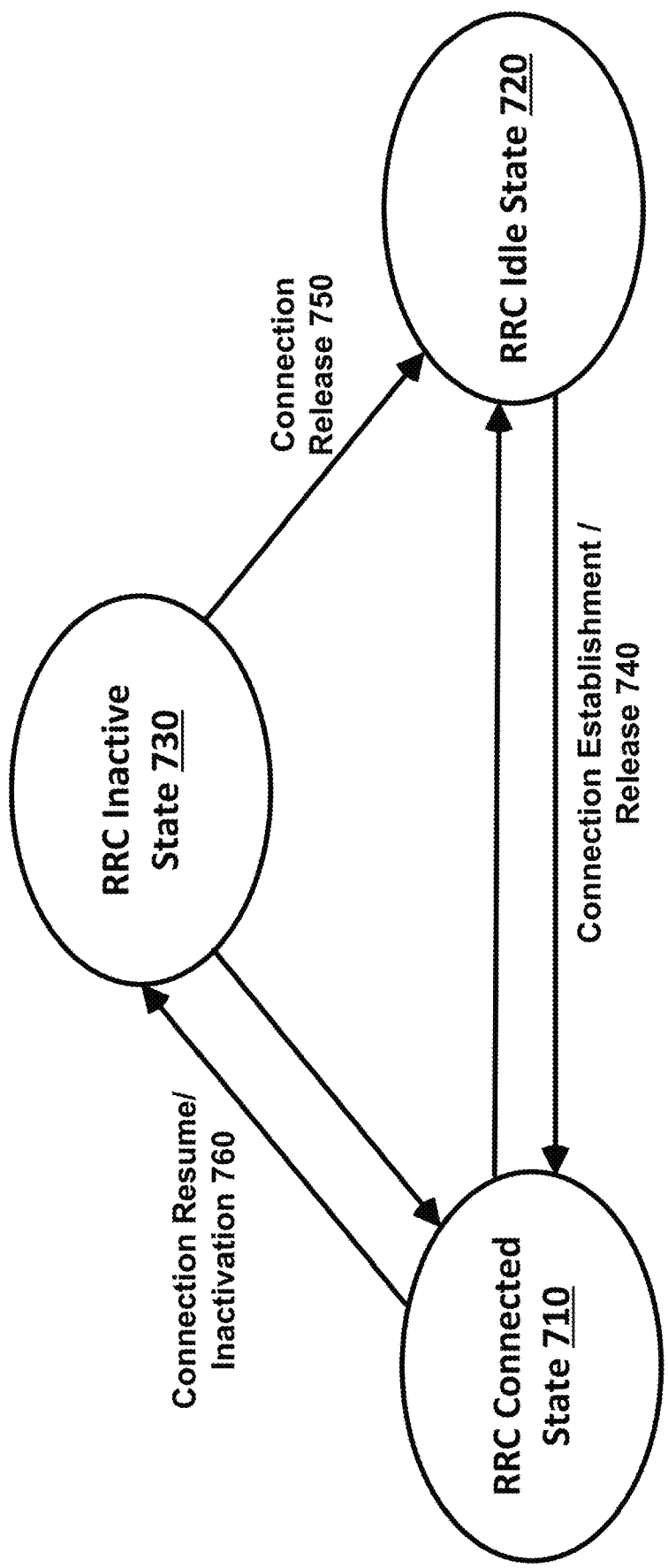
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
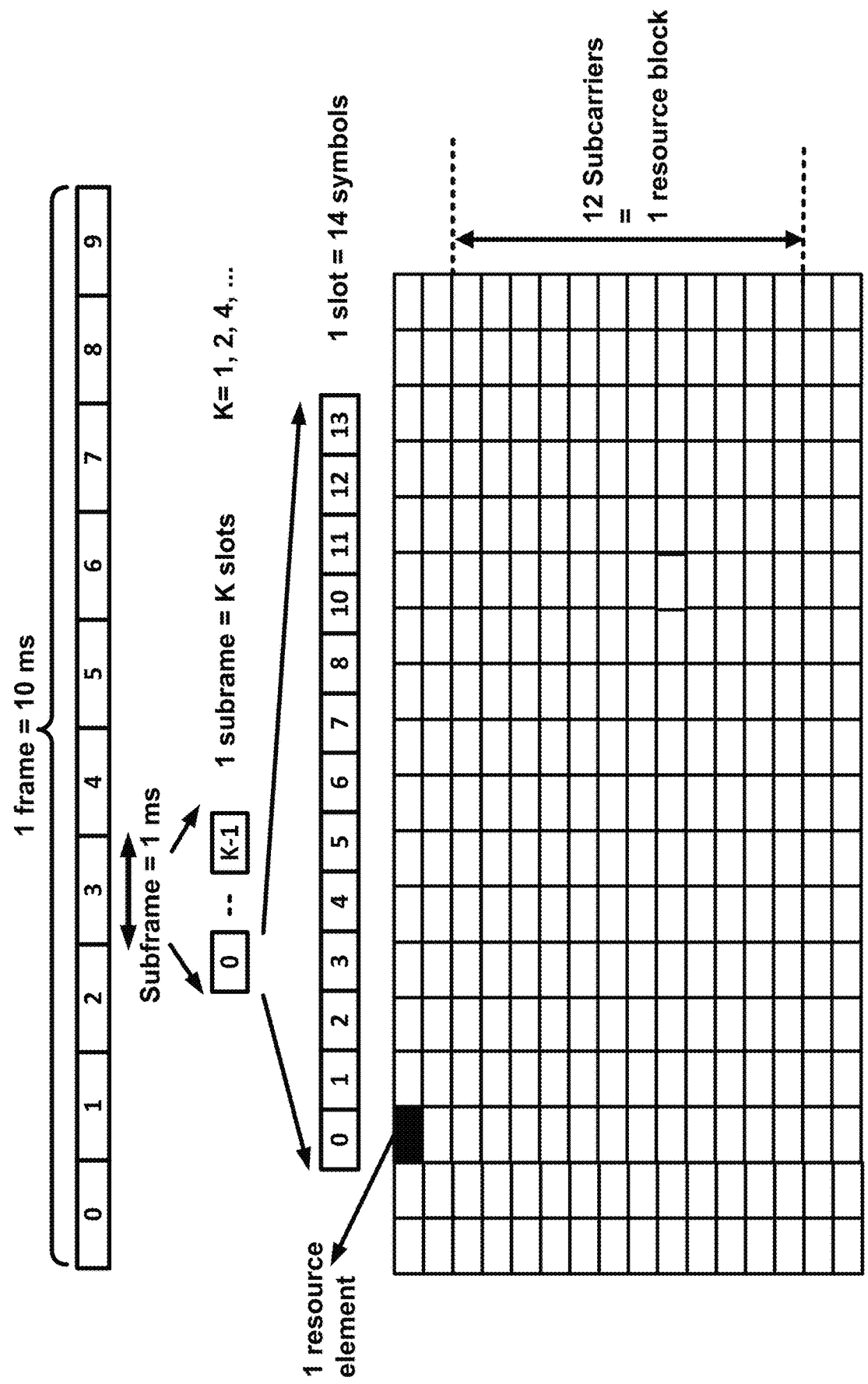
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
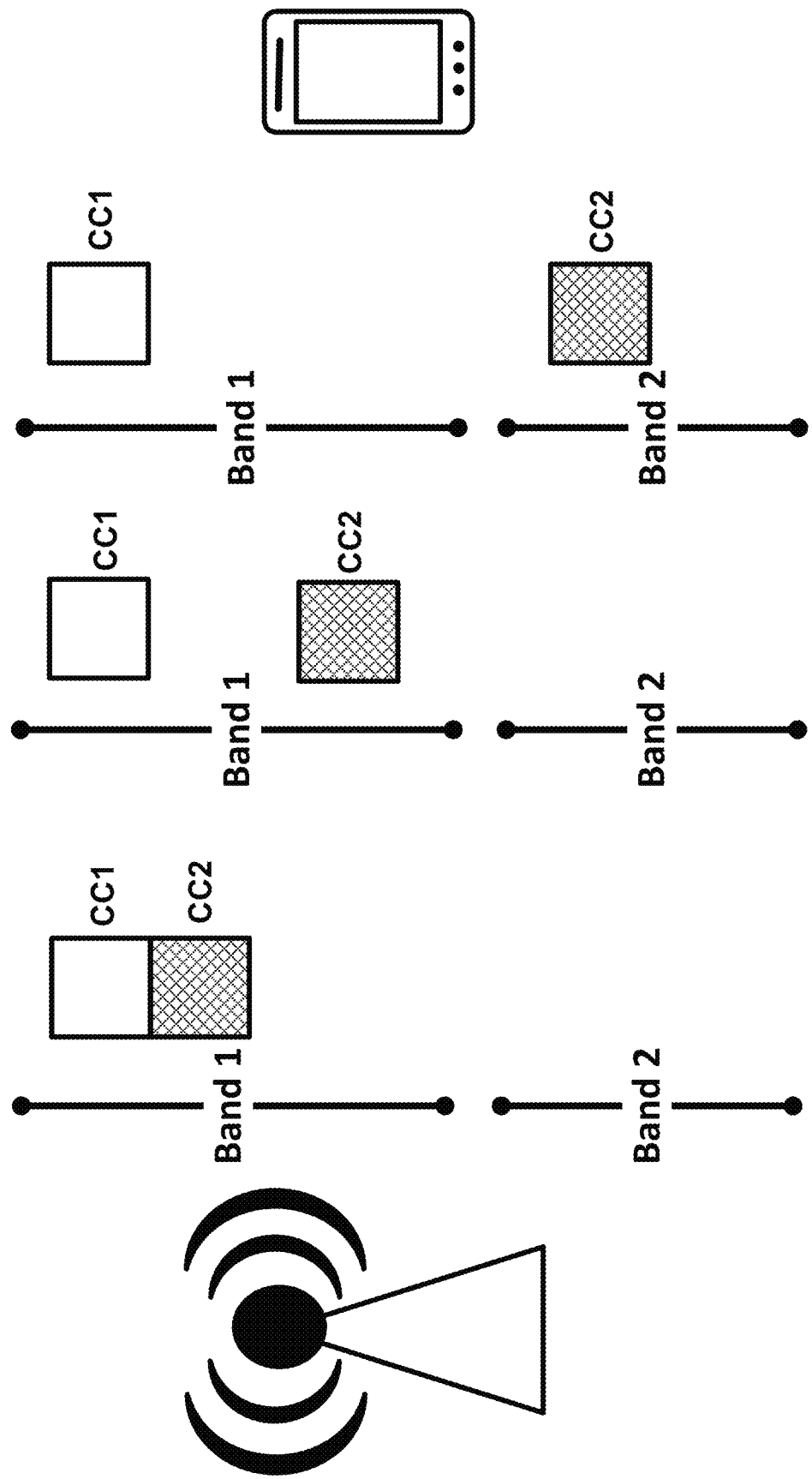
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
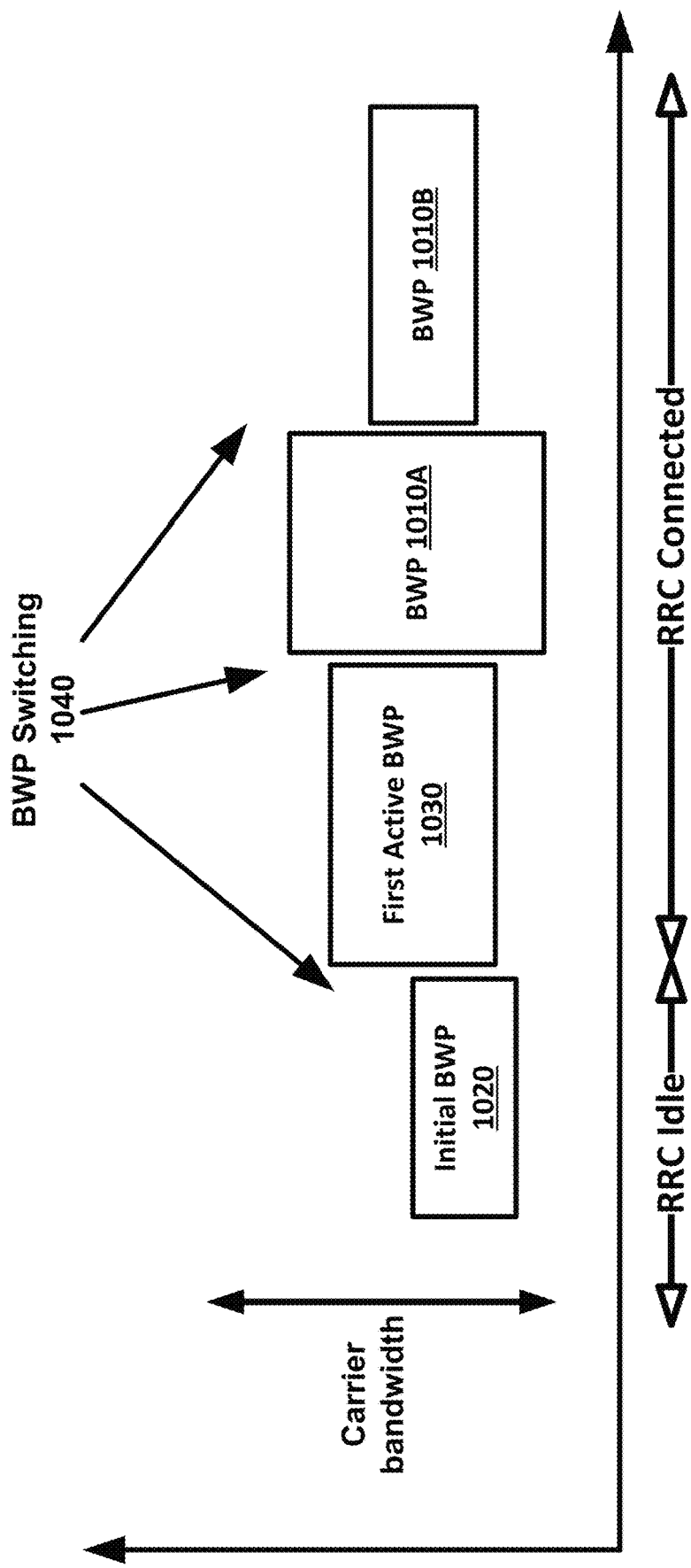
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
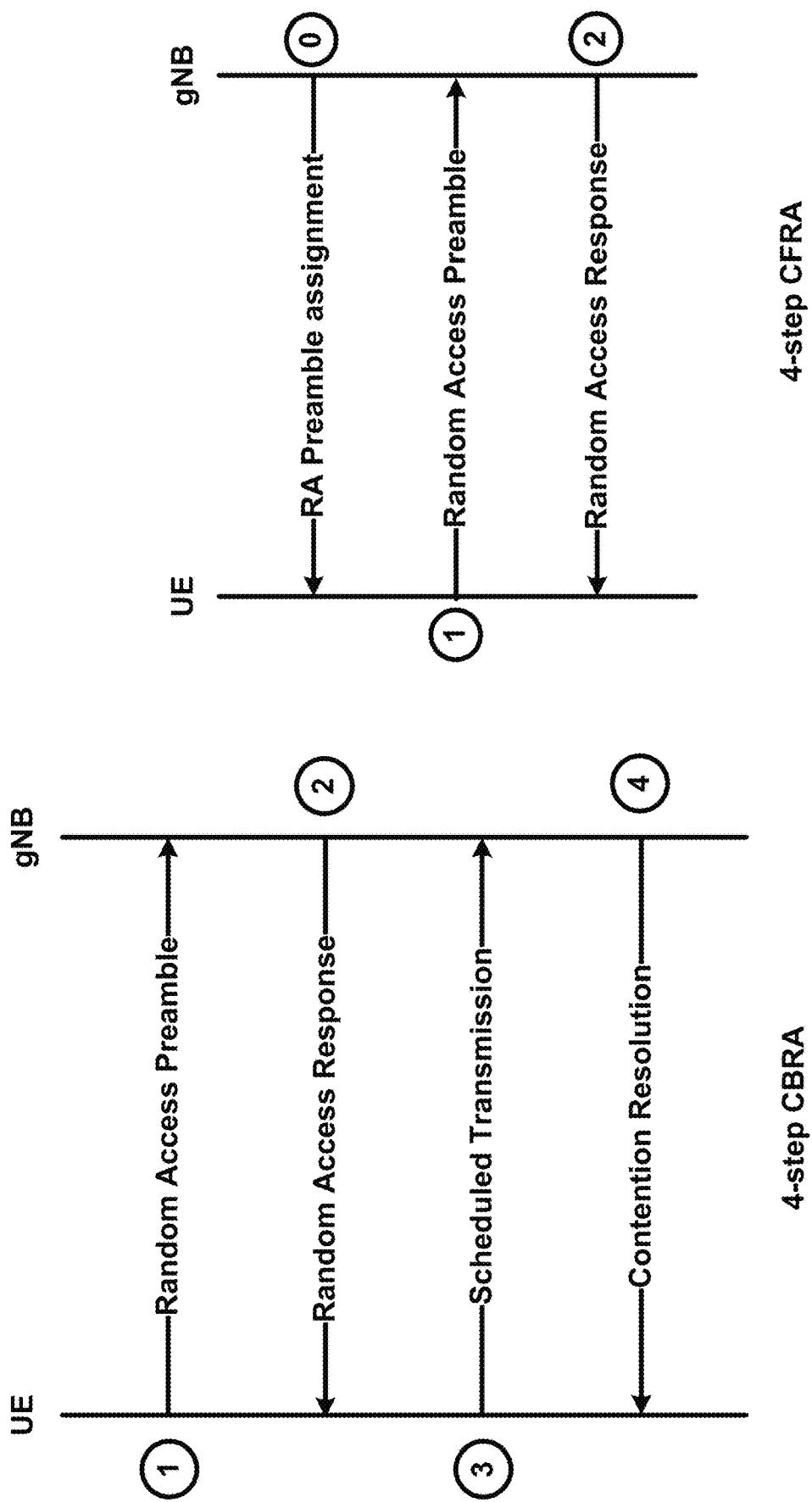
FIG. 11 shows example four-step contention-based and contention-free random access processes according to some aspects of some of various exemplary embodiments of the present disclosure.
Figure 12:
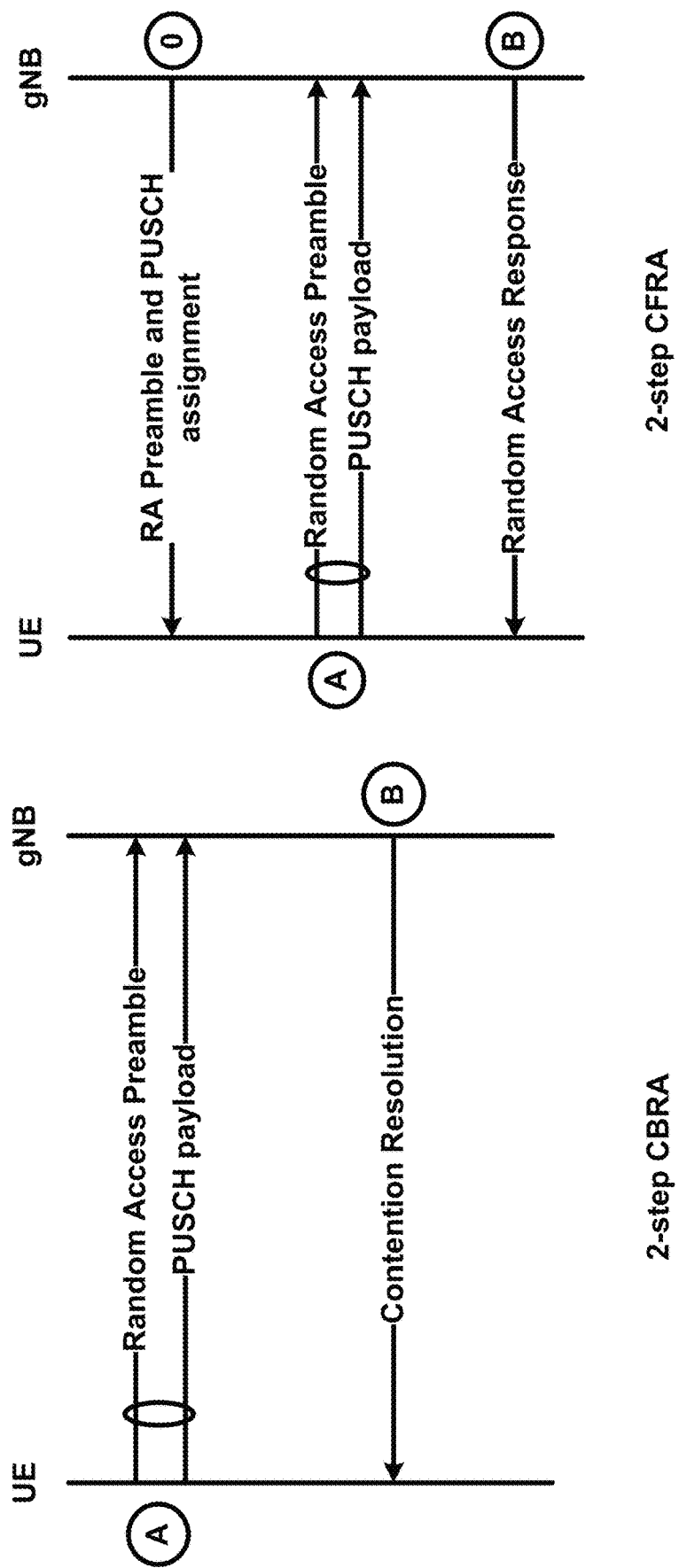
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
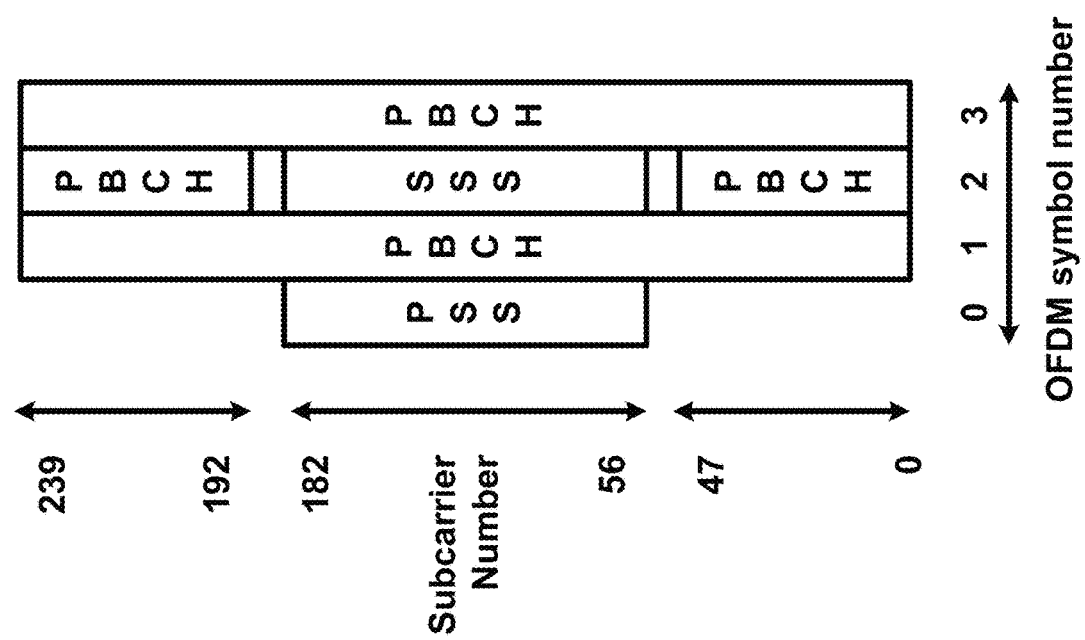
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
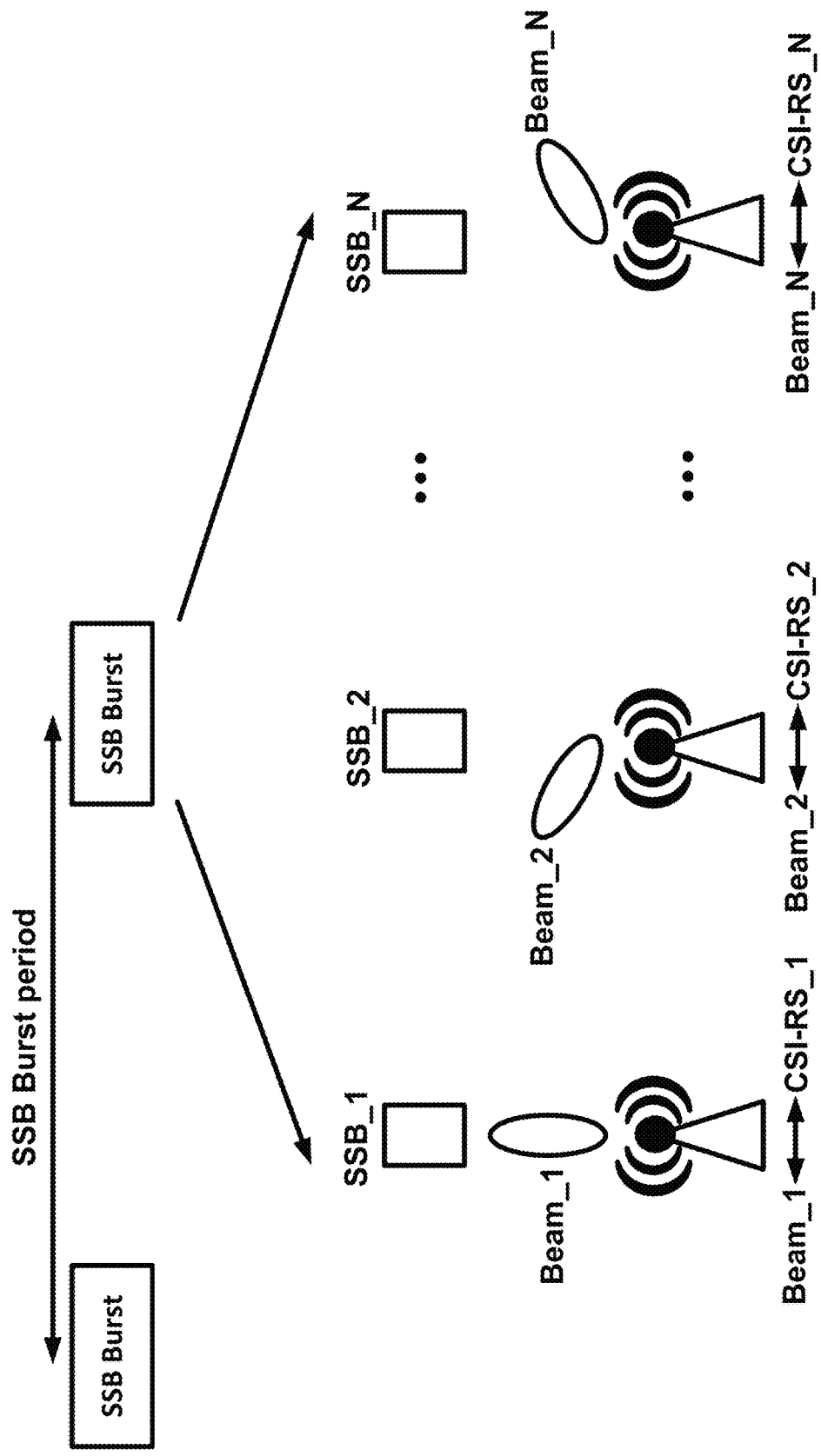
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
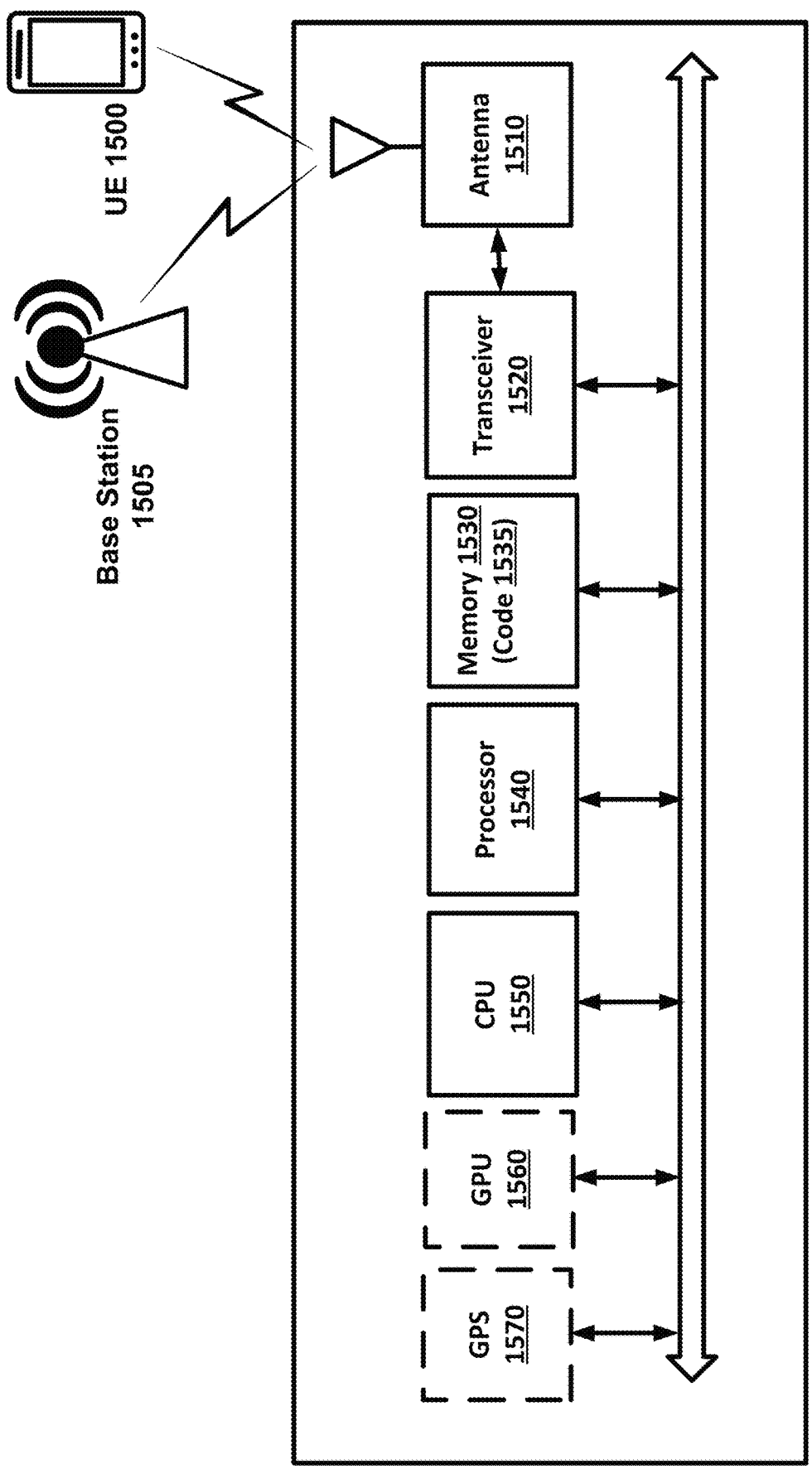
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some examples, a UE my operate according to a plurality of interfaces. An interface may operate using one or more frequency bands. The UE may be configured to operate on a plurality of frequency bands. The UE may be configured to operate using band combinations for Uu and V2X concurrent operation.

Figure 16:
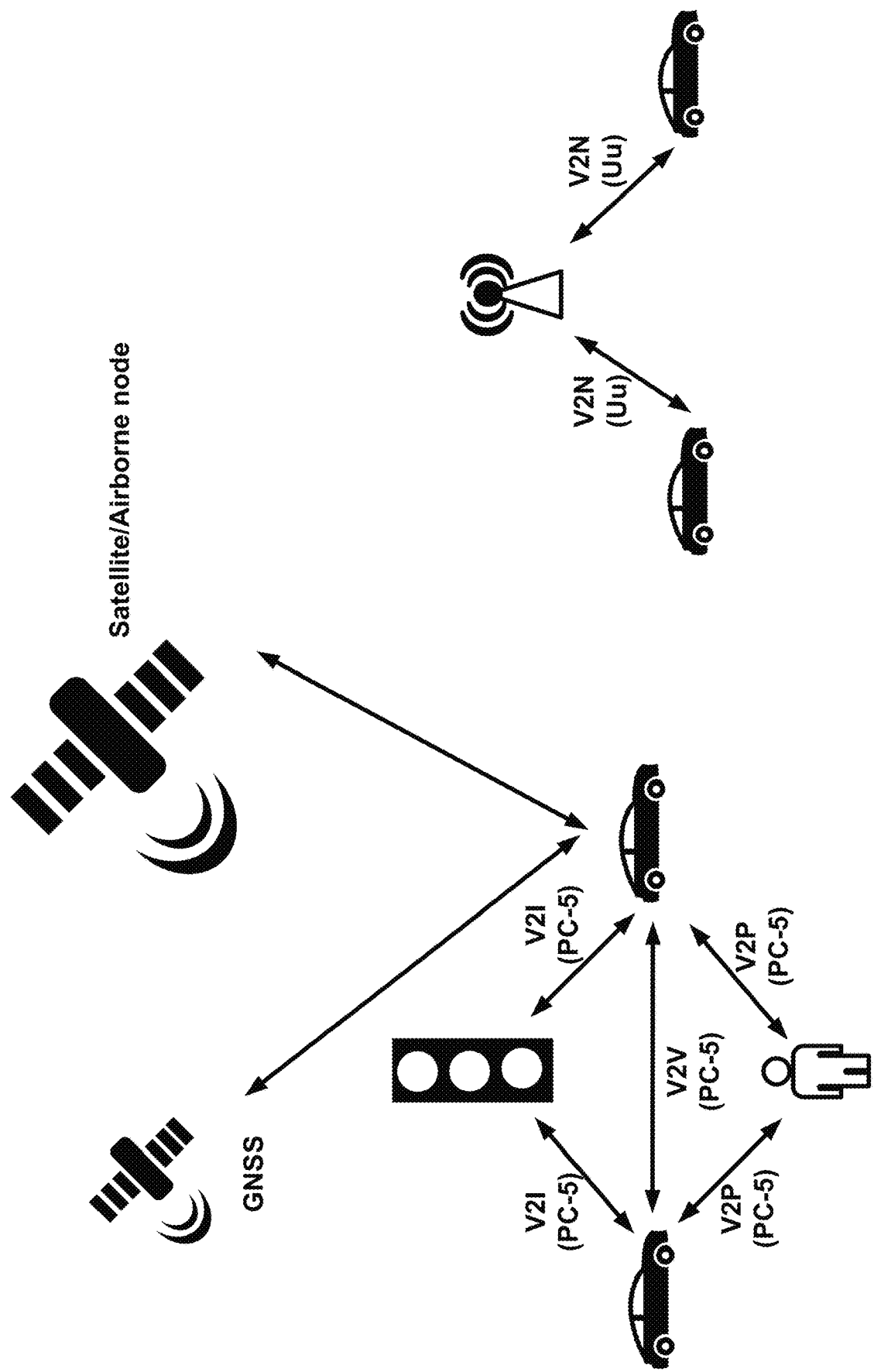
FIG. 16 shows example vehicular communications scenarios including a satellite or airborne node according to some aspects of some of various exemplary embodiments of the present disclosure.

In some examples as shown in in FIG. 16, a UE (e.g., a V2X UE) may detect Uu and PC5 signals and may also detect satellite/airborne signals that enable larger coverage. In an example scenario, a UE may establish an interface with one or more non-terrestrial nodes, such as a Satellite node or airborne node. For example, the UE may establish a connection/interface with a Global Navigation Satellite System (GNSS) (for example for the purpose of synchronization and/or updating UE connection status). The UE may be configured with and/or may utilize a plurality of interfaces, for example a Uu interface with a RAN node (such as a base station, for example for vehicle to network (V2N) communications), a PC-5 interface with a pedestrian (for vehicle to pedestrian (V2P) communications), a PC-5 interface with a vehicle (for example for a vehicle to vehicle (V2V) communications), a PC-5 interface with an infrastructure node (for example for a vehicle to vehicle (V2V) communications).

In some examples, an inter RAT mobility may be used that is characterized by the following. In some examples, the Source RAT may configure Target RAT measurement and reporting. The source RAT may decide on the preparation initiation and may provide the necessary information to the target RAT in the format required by the target RAT. For example, for handover preparation from E-UTRA to NR, the source RAT may issue a handover preparation request message to the target RAT passing a transparent RRC container with necessary information to prepare the handover at the target side. In some examples, radio resources may be prepared in the target RAT before the handover. In some examples, the RRC reconfiguration message from the target RAT may be delivered to the source RAT via a transparent container and may be passed to the UE by the source RAT in the handover command. In some examples, the inter-RAT handover command message may carry the same type of information required to access the target cell.

In some examples, the inter RAT measurements in NR may be for other RATs such as E-UTRA, RAT provided by satellite/airborne node, etc.

In some examples, cell reselection may be performed between NR RRC_IDLE and E-UTRA RRC_IDLE and between NR RRC_INACTIVE to E-UTRA RRC_IDLE based on measurements.

In some examples, the inter RAT handover may be characterized by the following: The Source RAT may configure Target RAT measurement and reporting. The source RAT may decide on the preparation initiation and provides the necessary information to the target RAT in the format required by the target RAT. Radio resources may be prepared in the target RAT before the handover. The RRC reconfiguration message from the target RAT may be delivered to the source RAT via a transparent container and may be passed to the UE by the source RAT in the handover command.

In some examples, the inter RAT measurements in NR may be for E-UTRA, satellite/airborne interface (e.g., non-terrestrial), etc.

In some examples, network controlled inter-RAT mobility between NR and E-UTRA or between NR and the satellite/airborne interface, etc. may be supported.

Figure 17:
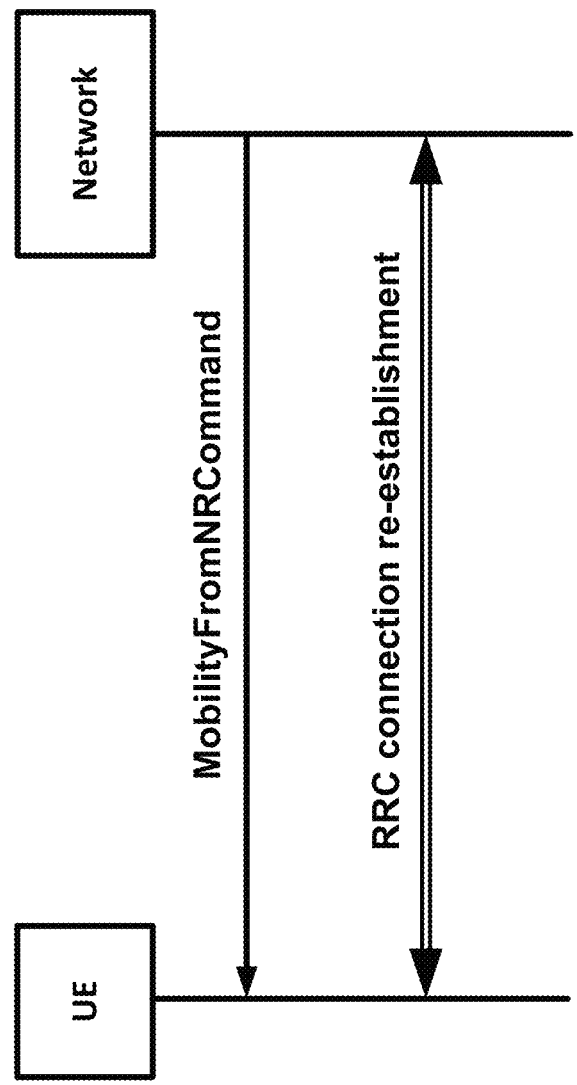
FIG. 17 shows an example process according to some aspects of some of various exemplary embodiments of the present disclosure.

In some examples, a Mobility from NR procedure may be used as shown in FIG. 17. The purpose of this procedure may be to move a UE in RRC_CONNECTED to a cell using other RAT, e.g., Satellite/airborne, E-UTRA, UTRA-FDD, etc. The mobility from NR procedure may be used for handover, for example, the MobilityFromNRCommand message may include radio resources that have been allocated for the UE in the target cell.

In some examples, the network may initiate the mobility from NR procedure to a UE in RRC_CONNECTED, possibly in response to a MeasurementReport or an MCGFailureInformation message, by sending a MobilityFromNR-Command message.

In some examples, the network may configure an RRC_CONNECTED UE to perform measurements. The network may configure the UE to report them in accordance with the measurement configuration or perform conditional reconfiguration evaluation in accordance with the conditional reconfiguration. The measurement configuration may be provided by means of dedicated signaling, e.g., using the RRCReconfiguration or RRCResume.

In some examples, the network may configure the UE to perform the following types of measurements: NR measurements; Inter-RAT measurements (e.g., of E-UTRA frequencies, of UTRA-FDD frequencies, by satellite/airborne frequencies, etc.)

In some examples, the network may configure the UE to report the following measurement information based on SS/PBCH block(s): measurement results per SS/PBCH block; measurement results per cell based on SS/PBCH block(s); SS/PBCH block(s) indexes.

In some examples, the network may configure the UE to report the following measurement information based on CSI-RS resources: measurement results per CSI-RS resource; measurement results per cell based on CSI-RS resource(s); CSI-RS resource measurement identifiers.

In some examples, the measurement configuration may include the following parameters: measurement objects (e.g., a list of objects on which the UE shall perform the measurements), Reporting configurations (e.g., a list of reporting configurations where there can be one or multiple reporting configurations per measurement object), measurement identities (e.g., a list of measurement identities where each measurement identity links one measurement object with one reporting configuration); quantity configurations (e.g., defining the measurement filtering configuration used for all event evaluation and related reporting, and for periodical reporting of that measurement); and measurement gaps (e.g., Periods that the UE may use to perform measurements).

In some examples, for intra-frequency and inter-frequency measurements a measurement object may indicate the frequency/time location and subcarrier spacing of reference signals to be measured. Associated with this measurement object, the network may configure a list of cell specific offsets. The network may further configure a list of cells that have been characterized as unavailable or ignored with regard event evaluation or measurement reporting. Still further, the network may further configured a list of cells that are characterized as available or preferred in event evaluation or measurement reporting.

In some examples, the measObjectId of the MO which corresponds to each serving cell may be indicated by servingCellMO within the serving cell configuration.

In some examples, for inter-RAT measurements, a measurement object may be a single carrier frequency (e.g., E-UTRA, satellite/airborne frequency). Associated with this E-UTRA carrier frequency, the network may configure a list of cell specific offsets, a list of identified cells that may not be applicable in event evaluation or measurement reporting and alternatively, cells that may be the ones applicable in event evaluation or measurement reporting.

In some examples, each measurement reporting configuration may comprise the following: Reporting criterion (the criterion that triggers the UE to send a measurement report. This may be periodical or a single event description); RS type (the RS that the UE uses for beam and cell measurement results (e.g., SS/PBCH block or CSI-RS)); reporting format (e.g., the quantities per cell and per beam that the UE may include in the measurement report (e.g., RSRP) and other associated information such as the maximum number of cells and the maximum number beams per cell to report).

In some examples, by configuring multiple measurement identities, it may be possible to link more than one measurement object to the same reporting configuration, and to link more than one reporting configuration to the same measurement object. The measurement identity may be included in the measurement report that triggered the reporting, serving as a reference to the network.

In some examples, for NR measurements, the network may configure up to a first number (e.g., 2) quantity configurations with a reference in the NR measurement object to the configuration that is to be used. In each configuration, different filter coefficients can be configured for different measurement quantities, for different RS types, and for measurements per cell and per beam.

In some examples, a UE in RRC_CONNECTED may maintain a measurement object list, a reporting configuration list, and a measurement identities list according to signaling and procedures in this specification. The measurement object list may include NR measurement object(s) and inter-RAT objects. In some examples, the reporting configuration list may include NR and inter-RAT reporting configurations. A measurement object may be linked to reporting configuration of the same RAT type. Some reporting configurations may not be linked to a measurement object. Likewise, some measurement objects may not be linked to a reporting configuration.

In some examples, for NR measurement object(s), the UE may measure and may report on the serving cell(s), listed cells and/or detected cells. In some examples, for inter-RAT measurements object(s) (e.g., of E-UTRA, satellite/airborne, etc.) the UE may measure and reports on listed cells and detected cells and, for RSSI and channel occupancy measurements, the UE may measure and report on the configured resources on the indicated frequency. In some examples, for inter-RAT measurements object(s) (e.g., of In some examples, an RRC_CONNECTED UE may derive cell measurement results by measuring one or multiple beams associated per cell as configured by the network. For cell measurement results, the UE may apply layer 3 filtering, before using the measured results for evaluation of reporting criteria, measurement reporting or the criteria to trigger conditional reconfiguration execution. For cell measurements, the network may configure RSRP, RSRQ, SINR, RSCP or EcN0 as trigger quantity. For cell and beam measurements, reporting quantities may be any combination of quantities (e.g., only RSRP; only RSRQ; only SINR; RSRP and RSRQ; RSRP and SINR; RSRQ and SINR; RSRP, RSRQ and SINR; only RSCP; only EcN0; RSCP and EcN0), irrespective of the trigger quantity. For conditional reconfiguration execution, the network may configure up to 2 quantities, both using same RS type.

In some examples, the network may configure the UE to report measurement information per beam (which may be measurement results per beam with respective beam identifier(s) or only beam identifier(s)). If beam measurement information is configured to be included in measurement reports, the UE may apply the layer 3 beam filtering.

In some examples, the network may configure the UE in RRC_CONNECTED to derive RSRP, RSRQ and SINR measurement results per cell associated to NR measurement objects based on parameters configured in the measObject (e.g., maximum number of beams to be averaged and beam consolidation thresholds) and in the reportConfig (rsType to be measured, SS/PBCH block or CSI-RS).

In some examples, the network may configure the UE in RRC_IDLE or in RRC_INACTIVE to derive RSRP and RSRQ measurement results per cell associated to NR carriers based on parameters configured in measIdleCarrierListNR within VarMeasIdleConfig.

In some examples, the purpose of the Measurement reporting procedure may be to transfer measurement results from the UE to the network.

For the measId for which the measurement reporting procedure was triggered, the UE may set the measResults within the MeasurementReport message.

In some examples, the UE variable VarLogMeasConfig may include the configuration of the logging of measurements to be performed by the UE while in RRC_IDLE, RRC_INACTIVE, covering intra-frequency, inter-frequency and inter-RAT mobility related measurements. The UE may perform logging of measurements while in RRC_IDLE and RRC_INACTIVE.

In some examples, the UE variable VarLogMeasReport may include the logged measurements information.

In some examples, the UE variable VarMeasConfig may include the accumulated configuration of the measurements to be performed by the UE, covering intra-frequency, inter-frequency and inter-RAT mobility related measurements.

In some examples, the UE variable VarMeasIdleConfig may include the configuration of the measurements to be performed by the UE while in RRC_IDLE or RRC_INACTIVE for NR inter-frequency and inter-RAT (e.g., EUTRA, Satellite/airborne, etc.) measurements.

In some examples, the UE variable VarMeasIdleReport may include the logged measurements information.

In some examples, the UE variable VarMeasReportList may include information about the measurements for which the triggering conditions have been met.

In some examples, a MeasurementReport message may be used for the indication of measurement results.

In some examples, an IE MeasConfig may specify measurements to be performed by the UE, and may cover intra-frequency, inter-frequency and inter-RAT mobility as well as configuration of measurement gaps.

In some examples, an IE MeasGapConfig may specify the measurement gap configuration and may control setup/release of measurement gaps.

In some examples, the IE MeasId may be used to identify a measurement configuration, e.g., linking of a measurement object and a reporting configuration.

In some examples, the IE MeasIdleConfig may be used to convey information to UE about measurements requested to be done while in RRC_IDLE or RRC_INACTIVE.

In some examples, the IE MeasIdToAddModList may concern a list of measurement identities to add or modify, with for each entry the measId, the associated measObjectId and the associated reportConfigId.

In some examples, the IE MeasObjectEUTRA may specify information applicable for E-UTRA cells.

In some examples, the IE MeasObjectSatAirborne may specify information applicable for Satellite/Airborne cells. In some examples, a physicalCellId field may indicate Physical cell identity of a cell in the cell list. In some examples, a cellIndividualOffset field may indicate cell individual offset applicable to a specific cell. In some examples, a allowedMeasBandwidth may indicate maximum allowed measurement bandwidth on a carrier frequency as defined by the parameter Transmission Bandwidth Configuration. In some examples, a blackCellsToAddModListSatAirborne field may indicate list of cells to remove from identified non-available cells. In some examples, a carrierFreq field may identify carrier frequency for which this configuration is valid.

In some examples, the IE MeasObjectId may be used to identify a measurement object configuration.

In some examples, the IE MeasObjectNR may specify information applicable for SS/PBCH block(s) intra/inter-frequency measurements and/or CSI-RS intra/inter-frequency measurements.

Current spectrum defined for Uu and PC5 bands may not provide sufficient coverage in all location and all times. For example, large rural areas may not be covered by Uu bands. Coverage issues need to be addressed to provide reliable V2X services on safety, vehicle operations management, autonomous driving, traffic efficiency and environmental friendliness etc. A satellite/airborne interface may help improving reliable coverage. Example embodiments enhance measurement and measurement reporting triggers for interfaces associated with and provided by satellite/airborne nodes.

A satellite/airborne link/interface may improve the V2X coverage significantly especially in rural areas. Networks that employ such interfaces may be referred to as Non-Terrestrial Networks (NTNs). The Non-terrestrial networks (NTN) may refer to networks, or segments of networks, using an airborne or spaceborne vehicle for transmission. Airborne vehicles may refer to High Altitude Platforms (HAPs) encompassing Unmanned Aircraft Systems (UAS)—including tethered UAS, Lighter than Air UAS and Heavier than Air UAS—all operating at altitude; typically between 8 and 50 km, quasi-stationary. An example of such networking is shown in FIG. 16, wherein Uu, PC5 and interfaces enabled by the satellite/airborne node may be employed for different scenarios including for the V2X communications.

In some examples, the physical layer for the non-terrestrial interface may be based on DVB-S2 with Adaptive Coding and Modulation on Forward Channel (downlink) and Frequency Division/Time Division Multiple Access on Return Channel (uplink). The UE (e.g., the V2X UE) may report its RF measurement of Non-terrestrial Network, such that RAN and Core may make decision on inter-RAT handover, cell reselection or other status changes.

The use of a non-terrestrial networking interface, e.g., based on connection with a satellite/airborne node, may provide coverage for UEs, including V2X UEs, in scenarios where the Uu and/or the PC5 interface do not provide sufficient coverage. Existing inter-RAT measurement and mobility processes may not enable measurement and mobility in scenarios where the UE supports and is configured for operation with satellite or airborne interfaces. Example embodiments enhance the existing inter-RAT measurement and mobility processes.

In example embodiments, a UE may determine a measurement/measurement report trigger based on an entering condition or a leaving condition.

In example embodiments, an entering condition may be based on an inequality: $Mn+Ofn+Ocn-Hys>Thresh$. An example leaving condition may be based on an inequality: $Mn+Ofn+Ocn+Hys<Thresh$. The variables defined in the above inequalities may be defined as follows: Mn may be the measurement result of an inter-RAT neighbor cell, not taking into account an offsets. Ofn may be a measurement object specific offset of a frequency of the inter-RAT neighbor cell. For example, the measurement object specific offset may be defined for a Satellite/Airborne measurement object (e.g., based on a measObjectSatAirborne measurement object IE) and Ofn may be a measurement object specific offset defined for the Satellite/Airborne measurement object and may correspond to the frequency of neighbor inter-RAT cell of Satellite or Airborne. Ocn may be the cell specific offset of the inter-RAT neighbour cell (e.g., a cellIndividualOffset as defined within the measObjectSatAirborne corresponding to the neighbor inter-RAT cell), and may be set to zero if not configured for the neighbour cell. Hys may be the hysteresis parameter for this event (e.g., hysteresis as defined within reportConfigInterRAT for this event). Thresh may be the threshold parameter for this event (e.g., based on a threshold parameter, e.g., b1-ThresholdSatAirborne defined for Satellite or Airborne within reportConfigInterRAT for this event). Mn may be expressed in dBm or in dB, depending on the measurement quantity of the inter-RAT neighbor cell. The Ofn, Ocn, Hys may be expressed in dB. Thresh may be expressed in the same unit as Mn.

In example embodiments, an entering condition may be based on an inequality $Mp+Hys<Thresh1$. In example embodiments, an entering condition may be based on an inequality $Mn+Ofn+Ocn-Hys>Thresh2$. In example embodiments, an example leaving condition may be based on an inequality $Mp-Hys>Thresh1$. In example embodiments, an example leaving condition may be based on an inequality $Mn+Ofn+Ocn+Hys<Thresh2$. The variables defined in the above inequalities may be defined as follows: Mp may be the measurement result of the PCell, not taking into account an offset. Mn may be the measurement result of the inter-RAT neighbor cell, not taking into account an offset. Ofn may be a measurement object specific offset of a frequency of the inter-RAT neighbor cell. For example, the measurement object specific offset may be defined for a Satellite/Airborne measurement object (e.g., based on a measObjectSatAirborne measurement object IE) and Ofn may be a measurement object specific offset defined for the Satellite/Airborne measurement object and may correspond to the frequency of neighbor inter-RAT cell of Satellite or Airborne. Ocn may be the cell specific offset of the inter-RAT neighbor cell (e.g., a cellIndividualOffset as defined within the measObjectSatAirborne corresponding to the neighbor inter-RAT cell) and may be set to zero if not configured for the neighbor cell. Hys may be the hysteresis parameter for this event (e.g., hysteresis as defined within reportConfigInterRAT for this event). Thresh1 may be the threshold parameter for this event (e.g., based on a threshold parameter, e.g., b2-ThresholdSatAirborne defined for Satellite or Airborne within reportConfigInterRAT for this event). Thresh2 may be the threshold parameter for this event (e.g., based on a threshold parameter, e.g., b2-ThresholdSatAirborne defined for Satellite or Airborne within reportConfigInterRAT for this event). Mp may be expressed in dBm in case of RSRP, or in dB in case of RSRQ and SINR. Mn may be expressed in dBm or dB, depending on the measurement quantity of the inter-RAT neighbor cell. Ofn, Ocn, Hys may be expressed in dB. Thresh1 may be expressed in the same unit as Mp. Thresh2 may be expressed in the same unit as Mn.

In example embodiments, an IE MeasObjectSatAirborne may be used that specify information applicable for Satellite or Airborne cells. An example MeasObjectSatAirborne IE and its fields are shown in FIG. 18.

In example embodiments, an IE ReportConfigInterRAT may specify criteria for triggering of an inter-RAT measurement reporting event (e.g., the inter-RAT measurement reporting events for E-UTRA, UTRA-FDD, and satellite/airborne, etc.). Example events may be B1 indicating that neighbor becomes better than absolute threshold and event B2 that PCell becomes worse than absolute threshold1 AND neighbor becomes better than another absolute threshold2. Example events B1 and B2 in the ReportConfigInterRAT IE are shown in FIG. 19.

Figure 20:
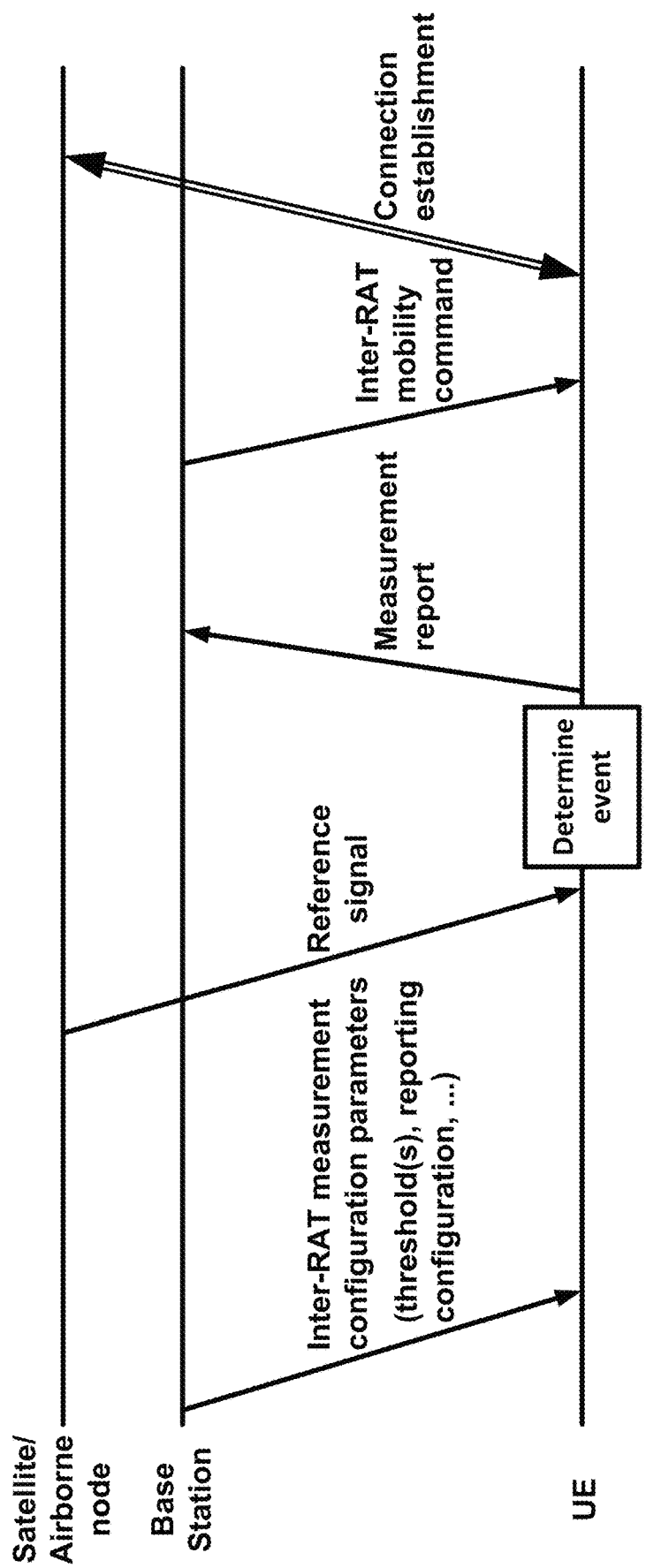
FIG. 20 shows an example process according to some aspects of some of various exemplary embodiments of the present disclosure.

In an example embodiment as shown in FIG. 20, a UE may receive inter-RAT measurement configuration parameters. The UE may be currently served by a base station providing connectivity using a cell of a RAT type and the base station may transmit the inter-RAT configuration parameters of a first RAT type for the UE. For example, the RAT type may be based on NR. For example, the RAT type may be based on LTE. For example, the first RAT type may be the RAT provided by a satellite/airborne node. For example, the inter-RAT measurement configuration may be for measurement of signals associated with the first RAT type and reporting the measurement results to the base station. For example, the inter-RAT measurement configuration parameters may be RRC configuration parameters. The UE may receive the inter-RAT measurement configuration parameters from the base station via one or more RRC messages.

In some examples, the UE may receive the inter-RAT measurement configuration parameters while in an RRC connected state. In some examples, the UE may receive the inter-RAT measurement configuration parameters in an RRC release message indicating transitioning from the RRC connected state and to an RRC idle or an RRC inactive state and the inter-RAT measurement and reporting may be while in the RRC inactive or the RRC idle state. For example, the RRC release message may comprise a information element comprising the inter-RAT measurement configuration parameters, such as a suspendconfig IE.

In some examples, the inter-RAT measurement configuration parameters may comprise reference signal configuration parameters. For example, the reference signal configuration parameters may indicate radio resources of the references signals for performing the measurements. The UE may measure the reference signals based on the configured radio resources of the reference signals. In some examples, the reference signals may comprise at least one of channel state information-reference signals (CSI-RSs) and synchronization signal blocks (SSBs).

The inter-RAT measurement configuration parameters may comprise one or more thresholds for detecting one or more events that trigger a measurement report. The UE may utilize the one or more thresholds by comparing measurement results, or values that are based on the measurement results (e.g., according to one or more equations) and detecting one or more events that trigger measurement reporting. The UE may utilize the measurement configuration parameters (e.g., the inter-RAT measurement configuration parameters) for determining the measurement results (e.g., the inter-RAT measurement results) and may compare the measurement results, or values that are based on the measurement results (e.g., according to one or more equations) and detecting one or more events that trigger measurement reporting. The reporting/transmission of the measurement report may be based on reporting configuration parameters. The inter-RAT measurement configuration parameters may comprise the reporting configuration parameters associated with the first RAT type.

The UE may determine, based on the one or more thresholds, that an event of the one or more events that trigger a measurement report has occurred. The UE may determine that a condition of one or more conditions, based on which the one or more events are triggered, is satisfied and accordingly trigger the measurement. The one or more conditions may be based on comparing the measurement results, or values that are based on the measurement results, with the one or more thresholds. For example, the one or more conditions may be based on the measurement results, or values that are based on the measurement results (e.g., according to one or more equations) being smaller or larger than the one or more thresholds.

In some examples, a first event, of the one or more events that trigger the measurement report, may be associated with an entering condition. For example, the entering condition may be satisfied based on the UE being close to/entering the coverage area of a base station of the first RAT type or based on leaving the currently serving base station of the RAT type. The entering condition may be determined based on measurement results of a neighboring cell of the first RAT type, being larger than a first threshold. In some examples, the entering condition based on a first offset, for example, the equation to determine measurement results may include a first offset value. The inter-RAT configuration parameters may include one or more offsets comprising the first offset. In some examples, an offset in the one or more offsets, included in the inter-RAT configuration parameters, may be cell specific, e.g., may be applicable for a particular cell (e.g., the cell of the first RAT type or provided by the satellite/airborne node). In some examples, an offset in the one or more offsets, included in the inter-RAT configuration parameters, may be a frequency specific offset, e.g., may be applicable for a specific frequency associated with the first RAT type or associated with the satellite/airborne node. In some examples, the entering condition may be based on a first hysteresis value, for example, the equation to determine the measurement results may include a first hysteresis value. The inter-RAT configuration parameters may include one or more hysteresis values comprising the first hysteresis value.

In some examples, a first event, of the one or more events that trigger the measurement report, may be associated with a leaving condition. For example, the leaving condition may be satisfied based on the UE being far from/leaving the coverage area of a base station of the first RAT type or based on leaving the currently serving base station of the RAT type. The leaving condition may be determined based on measurement results of a neighboring cell of the first RAT type, being smaller than a first threshold. In some examples, the leaving condition may be based on a first offset, for example, the equation to determine the measurement results may include a first offset value. The inter-RAT configuration parameters may include one or more offsets comprising the first offset. In some examples, the leaving condition may be based on a first hysteresis value, for example, the equation to determine the measurement results may include a first hysteresis value. The inter-RAT configuration parameters may include one or more hysteresis values comprising the first hysteresis value.

In some examples, a second event, of the one or more events that trigger the measurement report, may be associated with an entering condition. For example, the entering condition may be satisfied based on the UE being close to/entering the coverage area of a base station of the first RAT type or based on leaving the currently serving base station of the RAT type. The entering condition may be determined based on first measurement results of a neighboring cell of the first RAT type and second measurement results of a primary cell of the UE, being larger or smaller than one or more second thresholds. For example, the second event may be associated with an entering condition and may be in response to the first measurement results of a neighboring cell of the first RAT type and second measurement results of a primary cell of the UE being smaller than the one or more second thresholds and/or may be in response to the first measurement results of a neighboring cell of the first RAT type and second measurement results of a primary cell of the UE being larger than a the one or more second thresholds. For example, the second event may be associated with a leaving condition and may be in response to the first measurement results of a neighboring cell of the first RAT type and second measurement results of a primary cell of the UE being larger than the third threshold of the one or more second thresholds and/or may be in response to the first measurement results of a neighboring cell of the first RAT type and second measurement results of a primary cell of the UE being smaller than the fourth threshold of the one or more second thresholds. In some examples, the first measurement results of a neighboring cell of the first RAT type and second measurement results of a primary cell of the UE may be based on a second offset, for example, the equation to determine the first measurement results of a neighboring cell of the first RAT type and second measurement results of a primary cell of the UE may include a second offset value. The inter-RAT configuration parameters may include one or more offsets In some examples, the first measurement results of a neighboring cell of the first RAT type and second measurement results of a primary cell of the UE may be based on a second hysteresis value, for example, the equation to determine the first measurement results of a neighboring cell of the first RAT type and second measurement results of a primary cell of the UE may include a second hysteresis value. The inter-RAT configuration parameters may include one or more hysteresis values comprising the second hysteresis value.

In response to determining that the event that triggers the measurement report has occurred, the UE may transmit a measurement report to the base station. In some examples, the reporting of the measurement report may be via an RRC message. In some examples, the UE may be in the RRC inactive state or the RRC idle state when reporting the measurement report is triggered and the UE may transition from the RRC inactive state or the RRC idle state to the RRC inactive state to perform the measurement reporting. For example, the transitioning from the RRC inactive state or the RRC idle state to the RRC connected state may be based on a random access process. In some examples, the UE may use a truncated random access (e.g., up to Msg A or Msg3) and may remain in the RRC idle/inactive state without transitioning to the RRC connected state. In some examples, the UE may report the measurement report via a designated message in specific type of message. For example, e.g., MsgA or a Msg3. In some examples, the measurement report may include a measurement identifier. In some examples, the inter-RAT measurement configuration parameters may comprise/indicate the measurement report identifier. The measurement report may comprise measurement information/results associated with the first RAT type. In some examples, the inter-RAT measurement configuration parameters may comprise a parameter indicating a carrier frequency for a cell of the first RAT type (e.g., provided by the satellite/airborne node) and the inter-RAT configuration parameters may be valid for the cell of the first RAT type. The measurement and/or reporting the measurement report may be include information associated with the cell of the first RAT type. In some examples, the inter-RAT measurement configuration parameters may comprise a parameter indicating an allowed measurement bandwidth for a cell of the satellite or the airborne node. The measurement and/or reporting of the measurement report may be based on the allowed measurement bandwidth for the cell of the satellite or the airborne node. In some examples, the inter-radio access technology (RAT) measurement configuration parameters may indicate a measurement unavailability of one or more cells provided by the satellite or the airborne node. For example, the inter-RAT measurement configuration parameters may include identifiers of the one or more cells that have been identified as unavailable. The unavailability of the one or more cells may indicate that the measurement/measurement report may exclude the one or more cells.

The transmission of the measurement report to the base station may be based on the inter-RAT measurement configuration parameters. In response to the transmission of the measurement report, the UE may receive (e.g., via an RRC message) an inter-RAT mobility command. For example, the inter-RAT mobility command may be for handover (e.g., may comprise a handover request) of the UE from a current serving cell to a cell of the first RAT type. In some examples, the UE may establish connectivity with satellite/airborne node in response to receiving the handover command/request. In some examples, the handover request/command may comprise configuration parameters for establishing the connectivity with the satellite/airborne node and the UE may utilize the configuration parameters for establishing the connectivity with the satellite/airborne node.

In some examples, the UE may be in an RRC inactive state or an RRC idle state and the UE may use the measurement results for an idle state or inactive state procedure such as cell (re-)selection.

In an embodiment, a user equipment (UE) may receive inter-radio access technology (RAT) measurement configuration parameters associated with a first RAT provided by a satellite or an airborne node, wherein the inter-RAT measurement configuration parameters comprise: one or more thresholds for detecting one or more events that trigger a measurement report; and reporting configuration parameters for reporting a measurement report comprising measurement information associated with the first RAT. The UE may determine, based on the one or more thresholds, that an event, of the one or more events, has occurred. The UE may report, based on the reporting configuration parameters, a measurement report comprising measurement information associated with the first RAT. The UE may receive an inter-RAT mobility command in response to the reporting the measurement report.

In some embodiments, a first event, of the one or more events, may be in response to first measurement results of a neighboring cell of the first radio access technology (RAT), being larger or smaller than one or more thresholds. In some embodiments, the first event may be associated with an entering condition in response to the first measurement results being larger than one or more thresholds. In some embodiments, the first event may be associated with a leaving condition in response to the measurement results being smaller than the first threshold. In some embodiments, the inter-RAT measurement configuration parameters may further indicate one or more offsets; and the measurement results being of the one or more offsets. In some embodiments, the inter-RAT measurement configuration parameters may further indicate one or more hysteresis values; and the measurement results being of the one or more hysteresis values.

In some embodiments, a second event, of the one or more events, may be in response to a second value, that is based on at least one of first measurement results of a neighboring cell of the first radio access technology (RAT) and second measurement results of a primary cell configured for the user equipment, being larger or smaller than one or more second thresholds of the one or more thresholds. In some embodiments, the second event may be associated with an entering condition in response to the second value being smaller than one or more second thresholds. In some embodiments, the second event may be associated with a leaving condition in response to the second value being larger than the one or more second thresholds. In some embodiments, the second event may be associated with an entering condition in response to the second value being larger than one or more second thresholds. In some embodiments, the second event may be associated with a leaving condition in response to the second value being smaller than the one or more second thresholds. In some embodiments, the inter-RAT measurement configuration parameters may further indicate one or more offsets; and the second value may further be based on a second offset of the one or more offsets. In some embodiments, the inter-RAT measurement configuration parameters may further indicate one or more hysteresis values; and the second value may be further based on a second hysteresis value of the one or more hysteresis values.

In some embodiments, the inter-radio access technology (RAT) configuration parameters may comprise a first measurement identifier.

In some embodiments, the inter-radio access technology (RAT) measurement configuration parameters may indicate a carrier frequency for a cell of the satellite or the airborne node for which the inter-RAT measurement configuration parameters are valid.

In some embodiments, the inter-radio access technology (RAT) measurement configuration parameters may indicate an allowed measurement bandwidth for a cell of the satellite or the airborne node.

In some embodiments, the inter-radio access technology (RAT) measurement configuration parameters may indicate a measurement unavailability of one or more cells provided by the satellite or the airborne node. In some embodiments, the inter-radio access technology (RAT) measurement configuration parameters may comprise identifiers of the one or more cells in the unavailability.

In some embodiments, the inter-RAT measurement configuration parameters may further indicate one or more offsets; and an offset, of the one or more offsets, may be a cell specific offset for a first cell, of one or more cells, provided by the satellite or the airborne node.

In some embodiments, the inter-RAT measurement configuration parameters may further indicate one or more offsets; and an offset, of the one or more offsets, may be a frequency specific offset.

In some embodiments, the UE may receive first configuration parameters of reference signals. The UE may create the measurement report based on measuring the reference signals. In some embodiments, the reference signals may be at least one of channel state information (CSI)-reference signals (RSs) and synchronization signal blocks (SSBs).

In some examples, reporting the measurement report may be via a radio resource control (RRC) message.

In some examples, receiving the inter-radio access technology (RAT) mobility command may be via a radio resource control (RRC) message.

In some examples, the inter-radio access technology (RAT) mobility command indicates a handover request. In some examples, the UE may establish a connection with the satellite node or the airborne node in response to the inter-radio access technology (RAT) indicating the handover request. In some examples, the inter-radio access technology (RAT) mobility command may comprise first configuration parameters for establishing the connection with the satellite or the airborne node.

In some examples, the user equipment (UE) may be in a radio resource control (RRC) connected state.

In some examples, the user equipment (UE) may be in a radio resource control (RRC) idle state or an RRC inactive state. In some examples, the UE may receive a radio resource control (RRC) release message comprising the inter-radio access technology (RAT) measurement configuration parameters. In some examples, the radio resource control (RRC) release message comprises an information element (IE) indicating transitioning from an RRC connected state to the RRC inactive state. The suspendconfig IE comprises the inter-radio access technology (RAT) measurement configuration parameters. In some examples, the UE may report the measurement report is based on a random access process. In some examples, reporting the measurement report may be based on a MsgA message of a two-step random access process or a Msg3 of a four-step random access process. In some examples, the UE may transition from the radio resource control (RRC) idle state or the RRC inactive state to an RRC connected state based on the random access process.

In some examples, the user equipment (UE) may receive the inter-radio access technology (RAT) command in response to communications between the base station and the satellite or the airborne node that is associated with the first RAT.

In some examples, determining that the event has occurred may be based on layer three filtering of measurement results and comparing the filtered measurement results with the one or more thresholds.

In some examples, the user equipment (UE) may transmit to the base station, a capability message comprising a capability information element indicating that the UE is capable of supporting the first radio access technology (RAT). In some examples, receiving the inter-radio access technology (RAT) configuration parameters may be based on the capability message indicating that the UE is capable of supporting the first RAT.

In some examples, a core network may be commonly used for first radio access technology (RAT), associated with the satellite node or the airborne node, and a second RAT associated with the base station.

In some examples, a first core network may be used for first radio access technology (RAT), associated with the satellite node or the airborne node, and a second core network may be used for a second RAT associated with the base station.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of measurement reporting for inter-radio access technology (RAT) mobility in wireless communications, comprising
  receiving, by a user equipment (UE) from a base station, inter-RAT measurement configuration parameters associated with a first RAT provided by at least one of a satellite or an airborne node, wherein the inter-RAT measurement configuration parameters comprise:
  one or more thresholds for detecting one or more events that trigger generating a measurement report; and
  report configuration parameters comprising measurement information associated with the first RAT;
  determining that a first event has occurred, wherein determining that the first event has occurred is based, at least in part, on evaluation of one or more thresholds;
  transmitting a measurement report comprising measurement information associated with the first RAT, wherein the measurement report is generated based on the report configuration parameters; and
  receiving an inter-RAT mobility command in response to the transmitted the measurement report.

Clause 2. The method of Clause 1, wherein determining that the first event has occurred includes comparing first measurement results of a neighboring cell of the first RAT to the one or more thresholds.

Clause 3. The method of Clause 2, wherein the first event is associated with an entering condition in response to the first measurement results of a neighboring cell being larger than the one or more thresholds.

Clause 4. The method of Clause 2, wherein the first event is associated with a leaving condition in response to first measurement results of a neighboring cell being smaller than the one or more thresholds.

Clause 5. The method of Clause 2, wherein the inter-RAT measurement configuration parameters further include one or more offsets and wherein determining that the first event has occurred includes comparing first measurement results of a neighboring cell of the first RAT to the one or more offsets.

Clause 6. The method of Clause 2, wherein the inter-RAT measurement configuration parameters further include one or more hysteresis values and wherein determining that the first event has occurred includes comparing first measurement results of a neighboring cell of the first RAT to the one or more hysteresis values.

Clause 7. The method of Clause 1 further comprising determining that a second event has occurred, wherein determining that the second event has occurred is based, at least in part, on evaluation of one or more second thresholds.

Clause 8. The method of Claim 7, wherein determining that the second event has occurred is based on evaluation of the one or more thresholds includes comparing first measurement results of a neighboring cell of the first RAT, and on second measurement results of a primary cell configured for the user equipment to the one or more second.

Clause 9. The method of Clause 8, wherein the second event is associated with an entering condition associated with the first measurement results of a neighboring cell of the first RAT, and the measurement results of a primary cell configured for the user equipment being smaller than the one or more second thresholds.

Clause 10. The method of Clause 8, wherein the second event is associated with a leaving condition associated with the first measurement results of a neighboring cell of the first RAT, and the measurement results of a primary cell configured for the user equipment being larger than the one or more second thresholds.

Clause 11. The method of Clause 8, wherein the second event is associated with an entering condition associated with the first measurement results of a neighboring cell of the first RAT, and the measurement results of a primary cell configured for the user equipment being larger in response to the second value being larger than a plurality of the one or more second thresholds.

Clause 12. The method of Clause 8, wherein the second event is associated with a leaving condition associated with the first measurement results of a neighboring cell of the first RAT, and the measurement results of a primary cell configured for the user equipment being smaller than a plurality of the one or more second thresholds.

Clause 13. The method of Clause 7, wherein the inter-RAT measurement configuration parameters further include one or more offsets and wherein determining that the second event has occurred includes determining whether the second event has occurred based on the one or more offsets.

Clause 14. The method of Clause 7, wherein the inter-RAT measurement configuration parameters further include one or more hysteresis values and wherein determining that the second event has occurred includes determining whether the second event has occurred based on the one or more hysteresis values.

Clause 15. The method of Clause 1, wherein the inter-RAT configuration parameters comprise a first measurement identifier.

Clause 16. The method of Clause 1, wherein the inter-RAT measurement configuration parameters indicate a carrier frequency for a cell of the at least one of the satellite or the airborne node for which the inter-RAT measurement configuration parameters are valid.

Clause 17. The method of Clause 1, wherein the inter-RAT measurement configuration parameters indicate an allowed measurement bandwidth for a cell of the at least one of the satellite or the airborne node.

Clause 18. The method of Clause 1, wherein the inter-RAT measurement configuration parameters identify one or more cells provided by the at least one of the satellite or the airborne node that are not available.

Clause 19. The method of Clause 18, wherein the inter-RAT measurement configuration parameters include identifiers of the one or more cells identified in the list.

Clause 20. The method of Clause 1 wherein the inter-RAT measurement configuration parameters further identify one or more offsets and wherein at least one offset corresponds to a cell specific offset for a cell associated with the at least one of the satellite or the airborne node.

Clause 21. The method of Clause 1, wherein the inter-RAT measurement configuration parameters further indicate one or more offsets and wherein at least one offset corresponds to a frequency specific offset.

Clause 22. The method of Clause 1, further comprising:
receiving first configuration parameters of reference signals; and
generating the reported measurement report based on measuring the reference signals.

Clause 23. The method of Clause 22, wherein the reference signals are at least one of channel state information (CSI) reference signals (RSs) and synchronization signal blocks (SSBs).

Clause 24. The method of Clause 1, wherein transmitting the measurement report includes transmitting the measurement report via a radio resource control (RRC) message.

Clause 25. The method of Clause 1, wherein receiving the inter-RAT mobility command includes receiving the inter RAT mobility command via a RRC message.

Clause 26. The method of Clause 1, wherein the inter-RAT mobility command corresponds to a handover request.

Clause 27. The method of Clause 26 further comprising establishing a connection with the at least one of the satellite node or the airborne node in response to receiving the inter-RAT mobility command corresponding to the handover request.

Clause 28. The method of Clause 27, wherein the inter-RAT mobility command comprises first configuration parameters for establishing the connection with the at least one of the satellite or the airborne node.

Clause 29. The method of Clause 1, wherein the user equipment (UE) is in a RRC connected state.

Clause 30. The method of Clause 1, wherein the user equipment (UE) is in a RRC idle state or an RRC inactive state.

Clause 31. The method of Clause 30, further comprising receiving a RRC release message comprising the inter-RAT measurement configuration parameters.

Clause 32. The method of Clause 31, wherein the RRC release message comprises an information element includes information corresponding to a transition from an RRC connected state to the RRC inactive state.

Clause 33. The method of Clause 30, wherein reporting the measurement report is based on a random access process.

Clause 34. The method of Clause 33, wherein reporting the measurement report is based on a designated message of a two-step random access process.

Clause 35. The method of Clause 33, wherein reporting the measurement report is based on a designated message of a four-step random access process.

Clause 36. The method of Clause 33, further comprising transitioning from the RRC idle state or the RRC inactive state to an RRC connected state based on the random access process.

Clause 37. The method of Clause 1, wherein the inter-RAT command received by the user equipment (UE) is transmitted in response to communications between the base station and the satellite or the airborne node that is associated with the first RAT.

Clause 38. The method of Clause 1, wherein determining that the first event has occurred is based on layer three filtering of measurement results and comparing the filtered measurement results with the one or more thresholds.

Clause 39. The method of Clause 1, further comprising transmitting, to the base station, a capability message comprising a capability information element indicating that the UE is capable of supporting the first RAT.

Clause 40. The method of Clause 39, wherein transmission of the received inter-RAT configuration parameters occurs where the capability message indicates that the UE is capable of supporting the first RAT.

Clause 41. The method of Clause 1, wherein a core network is commonly used for first RAT, associated with the satellite node or the airborne node, and a second RAT associated with the base station.

Clause 42. The method of Clause 1, wherein a first core network is used for first RAT, associated with the satellite node or the airborne node, and a second core network is used for a second RAT associated with the base station.

Clause 43. A method of measurement reporting for inter-radio access technology (RAT) mobility in wireless communications, comprising
receiving inter-RAT measurement configuration parameters associated with a first RAT provided by a non-terrestrial node, wherein the inter-RAT measurement configuration parameters comprise:
information for detecting one or more events that trigger generating a measurement report; and
configuration parameters comprising measurement information associated with the first RAT;
determining one or more events based on processing the received inter-RAT measurement configuration parameters; and
generating a measurement report comprising measurement information associated with the first RAT, wherein the measurement report is based on the received inter-RAT measurement configuration parameters.

Clause 44. An apparatus for utilization in wireless communications comprising:
  an antenna for use in transmission of electromagnetic signals;
  a memory for maintaining computer-readable code; and
  a processor for executing the computer-readable code that causes the apparatus to:
  receiving, by a user equipment (UE) from a base station, inter-RAT measurement configuration parameters associated with a first RAT provided by at least one of a satellite or an airborne node, wherein the inter-RAT measurement configuration parameters comprise:
  one or more thresholds for detecting one or more events that trigger generating a measurement report; and
  report configuration parameters comprising measurement information associated with the first RAT;
  determining that a first event has occurred, wherein determining that the first event has occurred is based, at least in part, on evaluation of one or more thresholds;
  transmitting a measurement report comprising measurement information associated with the first RAT, wherein the measurement report is generated based on the report configuration parameters; and
  receiving an inter-RAT mobility command in response to the transmitted the measurement report.

Clause 45. The apparatus of Clause 44, wherein the apparatus determines that the first event has occurred by comparing first measurement results of a neighboring cell of the first RAT to the one or more thresholds.

Clause 46. The apparatus of Clause 45, wherein the first event is associated with an entering condition in response to the first measurement results of a neighboring cell being larger than the one or more thresholds.

Clause 47. The apparatus of Clause 46, wherein the first event is associated with a leaving condition in response to first measurement results of a neighboring cell being smaller than the one or more thresholds.

Clause 48. The apparatus of Clause 46, wherein the inter-RAT measurement configuration parameters further include one or more offsets and wherein determining that the first event has occurred includes comparing first measurement results of a neighboring cell of the first RAT to the one or more offsets.

Clause 49. The apparatus of Clause 46, wherein the inter-RAT measurement configuration parameters further include one or more hysteresis values and wherein determining that the first event has occurred includes comparing first measurement results of a neighboring cell of the first RAT to the one or more hysteresis values.

Clause 50. The apparatus of Clause 44, wherein the apparatus determines that a second event has occurred, wherein determining that the second event has occurred is based, at least in part, on evaluation of one or more second thresholds.

Clause 51. The apparatus of Clause 48, wherein the apparatus determines that the second event has occurred is based on evaluation of the one or more thresholds by comparing first measurement results of a neighboring cell of the first RAT, and on second measurement results of a primary cell configured for the user equipment to the one or more second.

Clause 52. The apparatus of Clause 51, wherein the second event is associated with an entering condition associated with the first measurement results of a neighboring cell of the first RAT, and the measurement results of a primary cell configured for the user equipment being smaller than the one or more second thresholds.

Clause 53. The apparatus of Clause 51, wherein the second event is associated with a leaving condition associated with the first measurement results of a neighboring cell of the first RAT, and the measurement results of a primary cell configured for the user equipment being larger than the one or more second thresholds.

Clause 54. The apparatus of Clause 51, wherein the second event is associated with an entering condition associated with the first measurement results of a neighboring cell of the first RAT, and the measurement results of a primary cell configured for the user equipment being larger in response to the second value being larger than a plurality of the one or more second thresholds.

Clause 55. The apparatus of Clause 49, wherein the second event is associated with a leaving condition associated with the first measurement results of a neighboring cell of the first RAT, and the measurement results of a primary cell configured for the user equipment being smaller than a plurality of the one or more second thresholds.

Clause 56. The apparatus of Clause 50, wherein the inter-RAT measurement configuration parameters further include one or more offsets and wherein determining that the second event has occurred includes determining whether the second event has occurred based on the one or more offsets.

Clause 57. The apparatus of Clause 50, wherein the inter-RAT measurement configuration parameters further include one or more hysteresis values and wherein determining that the second event has occurred includes determining whether the second event has occurred based on the one or more hysteresis values.

Clause 58. The apparatus of Clause 44, wherein the inter-RAT configuration parameters comprise a first measurement identifier.

Clause 59. The apparatus of Clause 44, wherein the inter-RAT measurement configuration parameters indicate a carrier frequency for a cell of the at least one of the satellite or the airborne node for which the inter-RAT measurement configuration parameters are valid.

Clause 60. The apparatus of Clause 47, wherein the inter-RAT measurement configuration parameters indicate an allowed measurement bandwidth for a cell of the at least one of the satellite or the airborne node.

Clause 61. The apparatus of Clause 44, wherein the inter-RAT measurement configuration parameters identify one or more cells provided by the at least one of the satellite or the airborne node that are not available.

Clause 62. The apparatus of Clause 61, wherein the inter-RAT measurement configuration parameters include identifiers of the one or more cells identified in the list.

Clause 63. The apparatus of Clause 44 wherein the inter-RAT measurement configuration parameters further identify one or more offsets and wherein at least one offset corresponds to a cell specific offset for a cell associated with the at least one of the satellite or the airborne node.

Clause 64. The apparatus of Clause 44, wherein the inter-RAT measurement configuration parameters further indicate one or more offsets and wherein at least one offset corresponds to a frequency specific offset.

Clause 65. The apparatus of Clause 1, wherein the apparatus:
  receives first configuration parameters of reference signals; and
  generates the reported measurement report based on measuring the reference signals.

Clause 66. The apparatus of Clause 65, wherein the reference signals are at least one of channel state information (CSI) reference signals (RSs) and synchronization signal blocks (SSBs).

Clause 67. The apparatus of Clause 44, wherein transmitting the measurement report includes transmitting the measurement report via a radio resource control (RRC) message.

Clause 68. The apparatus of Clause 44, wherein receiving the inter-RAT mobility command includes receiving the inter RAT mobility command via a RRC message.

Clause 69. The apparatus of Clause 44, wherein the inter-RAT mobility command corresponds to a handover request.

Clause 70. The apparatus of Clause 69 further comprising establishing a connection with the at least one of the satellite node or the airborne node in response to receiving the inter-RAT mobility command corresponding to the handover request.

Clause 71. The apparatus of Clause 27, wherein the inter-RAT mobility command comprises first configuration parameters for establishing the connection with the at least one of the satellite or the airborne node.

Clause 72. The apparatus of Clause 44, wherein the user equipment (UE) is in a RRC connected state.

Clause 73. The apparatus of Clause 44, wherein the user equipment (UE) is in a RRC idle state or an RRC inactive state.

Clause 74. The apparatus of Clause 73, wherein the apparatus receives a RRC release message comprising the inter-RAT measurement configuration parameters.

Clause 75. The apparatus of Clause 74, wherein the RRC release message comprises an information element includes information corresponding to a transition from an RRC connected state to the RRC inactive state.

Clause 76. The apparatus of Clause 73, wherein reporting the measurement report is based on a random access process.

Clause 77. The apparatus of Clause 76, wherein reporting the measurement report is based on a designated message of a two-step random access process.

Clause 78. The apparatus of Clause 76, wherein reporting the measurement report is based on a designated message of a four-step random access process.

Clause 79. The apparatus of Clause 78, further comprising transitioning from the RRC idle state or the RRC inactive state to an RRC connected state based on the random access process.

Clause 80. The apparatus of Clause 44, wherein the inter-RAT command received by the user equipment (UE) is transmitted in response to communications between the base station and the satellite or the airborne node that is associated with the first RAT.

Clause 81. The apparatus of Clause 44, wherein determining that the first event has occurred is based on layer three filtering of measurement results and comparing the filtered measurement results with the one or more thresholds.

Clause 82. The apparatus of Clause 44, further comprising transmitting, to the base station, a capability message comprising a capability information element indicating that the UE is capable of supporting the first RAT.

Clause 83. The apparatus of Clause 82, wherein transmission of the received inter-RAT configuration parameters occurs where the capability message indicates that the UE is capable of supporting the first RAT.

Clause 84. The apparatus of Clause 44, wherein a core network is commonly used for first RAT, associated with the satellite node or the airborne node, and a second RAT associated with the base station.

Clause 85. The apparatus of Clause 44, wherein a first core network is used for first RAT, associated with the satellite node or the airborne node, and a second core network is used for a second RAT associated with the base station.

Clause 86. An apparatus for utilization in wireless communications comprising:
an antenna for use in transmission of electromagnetic signals;
a memory for maintaining computer-readable code; and
a processor for executing the computer-readable code that causes the apparatus to:
receive inter-RAT measurement configuration parameters associated with a first RAT provided by a non-terrestrial node, wherein the inter-RAT measurement configuration parameters comprise:
information for detecting one or more events that trigger generating a measurement report; and
configuration parameters comprising measurement information associated with the first RAT;
determine one or more events based on processing the received inter-RAT measurement configuration parameters; and
generate a measurement report comprising measurement information associated with the first RAT, wherein the measurement report is based on the received inter-RAT measurement configuration parameters.

The invention claimed is:

1. A method of handover from a Terrestrial Network (TN) cell provided by a Radio Access Network (RAN) node to a Non-Terrestrial Network (NTN) cell provided by a satellite or an airborne node, the method comprising:
receiving, by a user equipment (UE), from the RAN node over a Uu interface, one or more measurement configuration parameters, wherein the one or more measurement configuration parameters comprise:
one or more reference signal configuration parameters for performing measurements;
one or more thresholds for detecting one or more events that trigger a measurement report;
one or more cell specific parameters applicable for the NTN cell provided by the satellite or the airborne node; and
one or more report configuration parameters comprising measurement information associated with the satellite or the airborne node;
transmitting, by the UE, to the RAN node over the Uu interface, the measurement report, wherein the measurement report comprises one or more measurement results associated with the NTN cell provided by the satellite or the airborne node, and wherein the measurement report is based on the one or more measurement configuration parameters;
receiving, by the UE, from the RAN node over the Uu interface, a handover command for the handover from the TN cell provided by the RAN node to the NTN cell provided by the satellite or the airborne node after transmitting the measurement report; and
establishing, by the UE, a connectivity with the satellite or the airborne node after receiving the handover command.

2. The method of claim 1, further comprising:
determining whether a first event of the one or more events has occurred, wherein determining whether the first event has occurred comprises comparing one or more first measurement results of a neighboring cell to the one or more thresholds.

3. The method of claim 2, wherein the first event is associated with an entering condition in response to the one or more first measurement results of the neighboring cell being larger than the one or more thresholds.

4. The method of claim 2, wherein the first event is associated with a leaving condition in response to the one or more first measurement results of the neighboring cell being smaller than the one or more thresholds.

5. The method of claim 2, further comprising:
determining whether a second event of the one or more events has occurred,
wherein determining whether the second event has occurred is based, at least in part, on evaluation of one or more second thresholds.

6. The method of claim 5, wherein determining whether the second event has occurred includes comparing the one or more first measurement results of the neighboring cell and on and one or more second measurement results of a primary cell configured for the UE to the one or more second thresholds.

7. The method of claim 6, wherein the second event is associated with an entering condition associated with the one or more first measurement results of the neighboring cell and the one or more second measurement results of the primary cell configured for the UE being smaller than the one or more second thresholds.

8. The method of claim 6, wherein the second event is associated with a leaving condition associated with the one or more first measurement results of the neighboring cell of and the one or more second measurement results of the primary cell configured for the UE being larger than the one or more second thresholds.

9. The method of claim 6, wherein the second event is associated with an entering condition associated with the one or more first measurement results of the neighboring cell and the one or more second measurement results of the primary cell configured for the UE being larger than of the one or more second thresholds.

10. The method of claim 6, wherein the second event is associated with a leaving condition associated with the one or more first measurement results of the neighboring cell and the one or more second measurement results of the primary cell configured for the UE being smaller than the one or more second thresholds.

11. The method of claim 2, wherein determining whether the first event has occurred is based on a layer three filtering of the one or more first measurement results and comparing one or more filtered measurement results with the one or more thresholds.

12. The method of claim 1, wherein the one or more measurement configuration parameters indicate a carrier frequency for the NTN cell provided by the satellite or the airborne node for which the one or more measurement configuration parameters are valid.

13. The method of claim 1, wherein the RAT one or more measurement configuration parameters indicate an allowed measurement bandwidth for the NTN cell provided by the satellite or the airborne node.

14. The method of claim 1, wherein the one or more measurement configuration parameters identify one or more NTN cells provided by the satellite or the airborne node that are not available.

15. The method of claim 14, wherein the one or more measurement configuration parameters include one or more identifiers of the one or more NTN cells.

16. The method of claim 1, wherein the UE is in a radio resource control (RRC) connected state.

17. The method of claim 1, wherein the UE is in a RRC idle state or an RRC inactive state.

18. The method of claim 1, wherein the handover command received by the UE is transmitted in response to communications between the RAN node and the satellite or the airborne node.

19. A user equipment (UE) configured to perform handover from a Terrestrial Network (TN) cell provided by a Radio Access Network (RAN) node to a Non-Terrestrial Network (NTN) cell provided by a satellite or an airborne node, the UE comprising:
receiving circuitry configured to receive, from the RAN node over a Uu interface, one or more measurement configuration parameters, wherein the one or more measurement configuration parameters comprise:
one or more reference signal configuration parameters for performing measurements;
information for detecting one or more events that trigger a measurement report;
information applicable for the NTN cell provided by the satellite or the airborne node; and
one or more report configuration parameters comprising measurement information associated with the satellite or the airborne node;
transmitting circuitry configured to transmit, to the RAN node over the Uu interface, the measurement report, wherein the measurement report comprises one or more measurement results associated with the NTN cell provided by the satellite or the airborne node, and wherein the measurement report is based on the one or more measurement configuration parameters,
wherein the receiving circuitry is configured to receive, from the RAN node over the Uu interface, a handover command for the handover from the TN cell provided by the RAN node to the NTN cell provided by the satellite or the airborne node after transmitting the measurement report; and
establishing circuitry configured to establish a connectivity with the satellite or the airborne node after receiving the handover command.

20. A method of handover from a Terrestrial Network (TN) cell provided by a Radio Access Network (RAN) node to a Non-Terrestrial Network (NTN) cell provided by a satellite or an airborne node, the method comprising:
transmitting, by the RAN node, to a user equipment (UE) over a Uu interface, one or more measurement configuration parameters, wherein the one or more measurement configuration parameters comprise:
one or more reference signal configuration parameters for performing measurements;
one or more thresholds for detecting one or more events that trigger a measurement report;
one or more cell specific parameters applicable for the NTN cell provided by the satellite or the airborne node; and
one or more report configuration parameters comprising measurement information associated with the satellite or the airborne node;
receiving, by the RAN node, from the UE over the Uu interface, the measurement report, wherein the measurement report comprises one or more measurement results associated with the NTN cell provided by the satellite or the airborne node, and wherein the measurement report is based on the one or more measurement configuration parameters; and transmitting, by the RAN node, to the UE over the Uu interface, a handover command for the handover from the TN cell provided by the RAN node to the NTN cell provided by the satellite or the airborne node after receiving the measurement report.

21. A Radio Access Network (RAN) node configured to communicate with a user equipment (UE) that performs handover from a Terrestrial Network (TN) cell provided by the RAN node to a Non-Terrestrial Network (NTN) cell provided by a satellite or an airborne node, the RAN node comprising:

transmitting circuitry configured to transmit, to the UE over a Uu interface, one or more measurement configuration parameters, wherein the inter RAT one or more measurement configuration parameters comprise:

one or more reference signal configuration parameters for performing measurements;

information for detecting one or more events that trigger a measurement report;

information applicable for the NTN cell provided by the satellite or the airborne node; and one or more report configuration parameters comprising measurement information associated with satellite or the airborne node; and receiving circuitry configured to receive, from the UE over the Uu interface, the measurement report, wherein the measurement report comprises one or more measurement results associated with the NTN cell provided by the satellite or the airborne node, and wherein the measurement report is based on the one or more measurement configuration parameters;

wherein the transmitting circuitry is configured to transmit, to the UE over the Uu interface, a handover command for the handover from the TN cell provided by the RAN node to the NTN cell provided by the satellite or the airborne node after receiving the measurement report.

* * * * *